Jan. 12, 1960 W. A. SCHMALL 2,920,551
COMBINATION ELECTRIC TOASTER AND OVEN APPLIANCE
Filed March 27, 1957 9 Sheets-Sheet 1

Inventor:
Wilbur A. Schmall,
by Armand Cifelli
His Attorney.

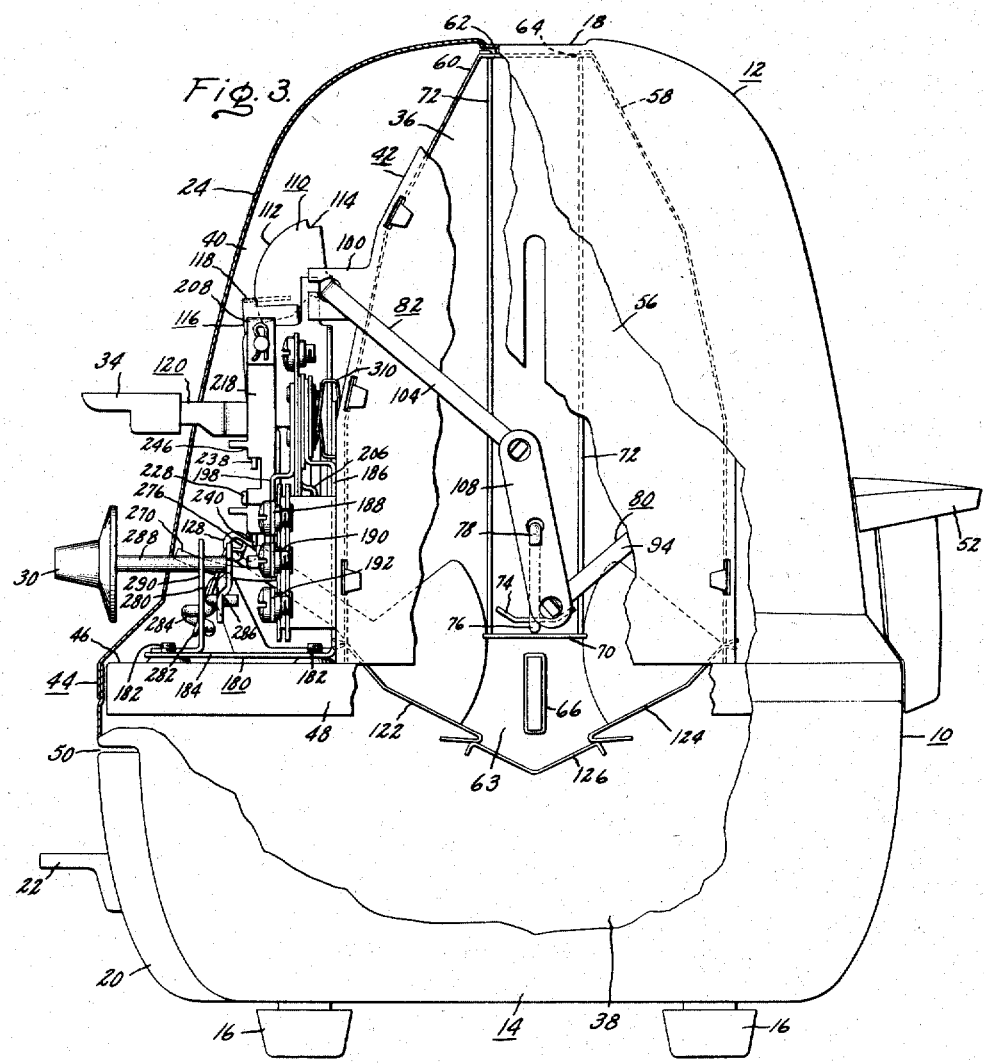

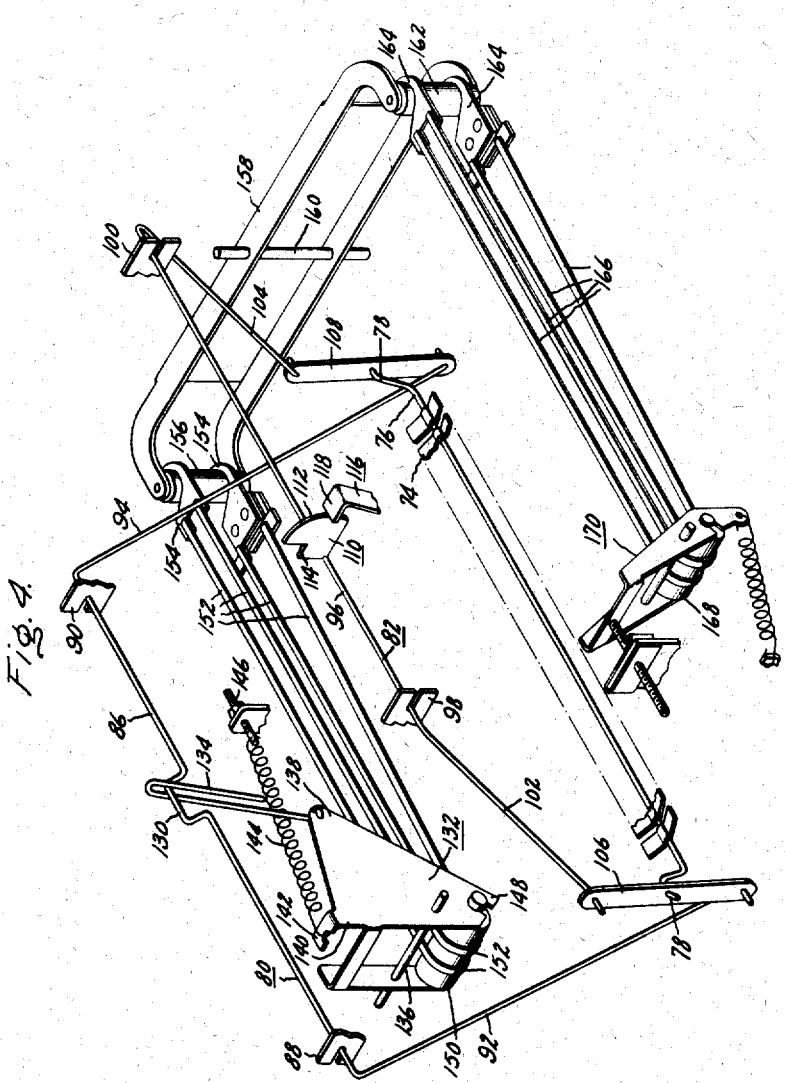

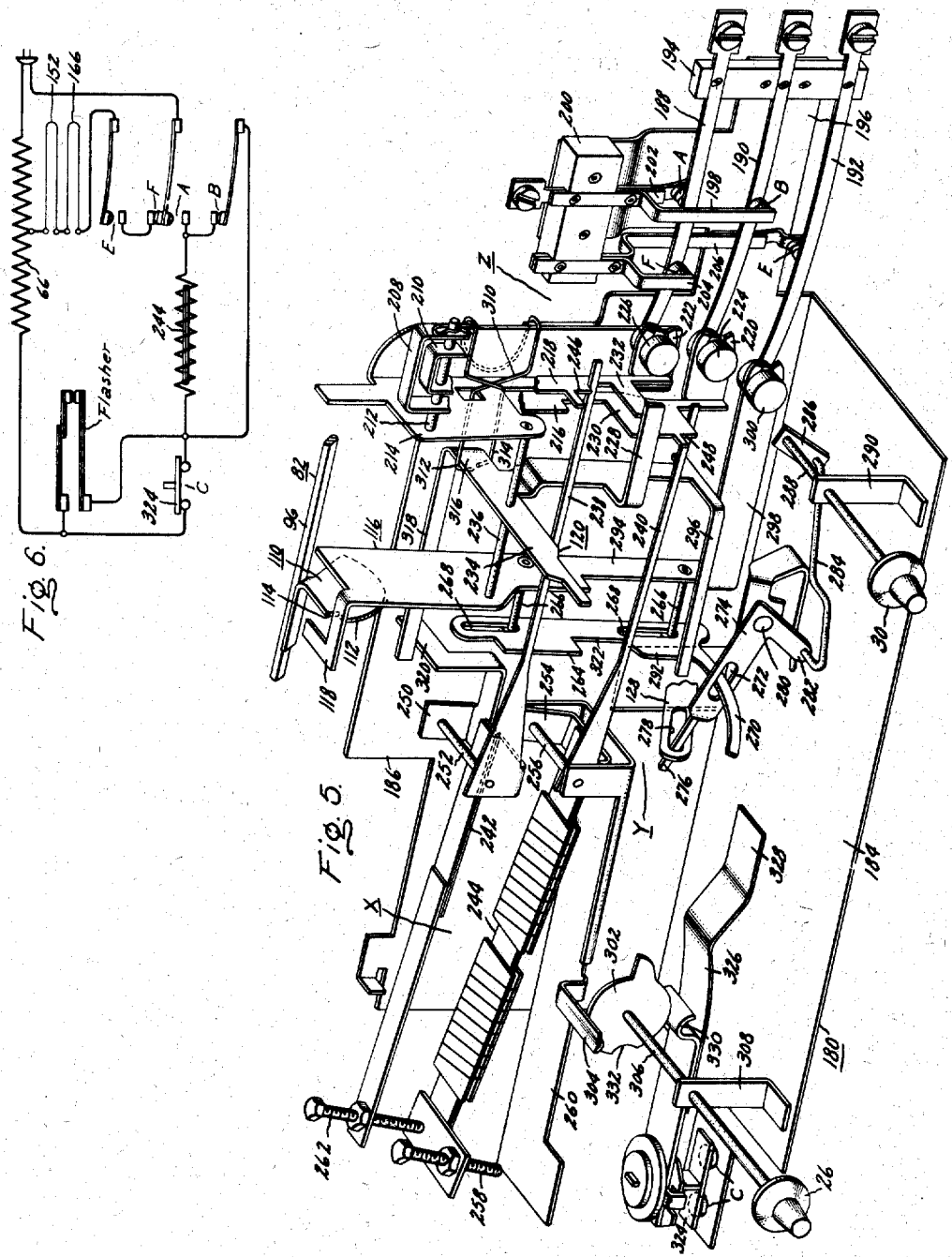

Jan. 12, 1960 W. A. SCHMALL 2,920,551
COMBINATION ELECTRIC TOASTER AND OVEN APPLIANCE
Filed March 27, 1957 9 Sheets-Sheet 5

Inventor:
Wilbur A. Schmall,
by Armand Cifelli
His Attorney.

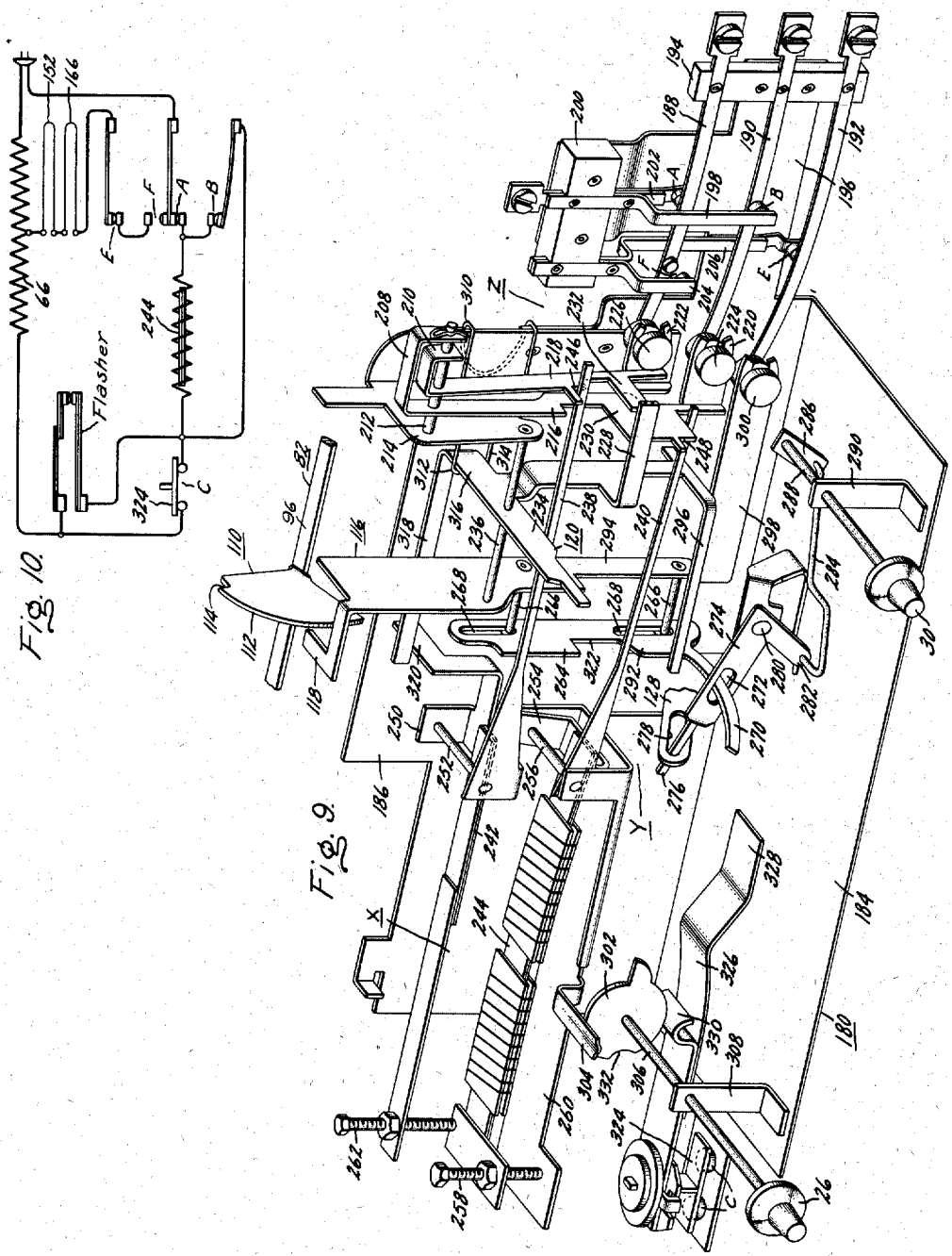

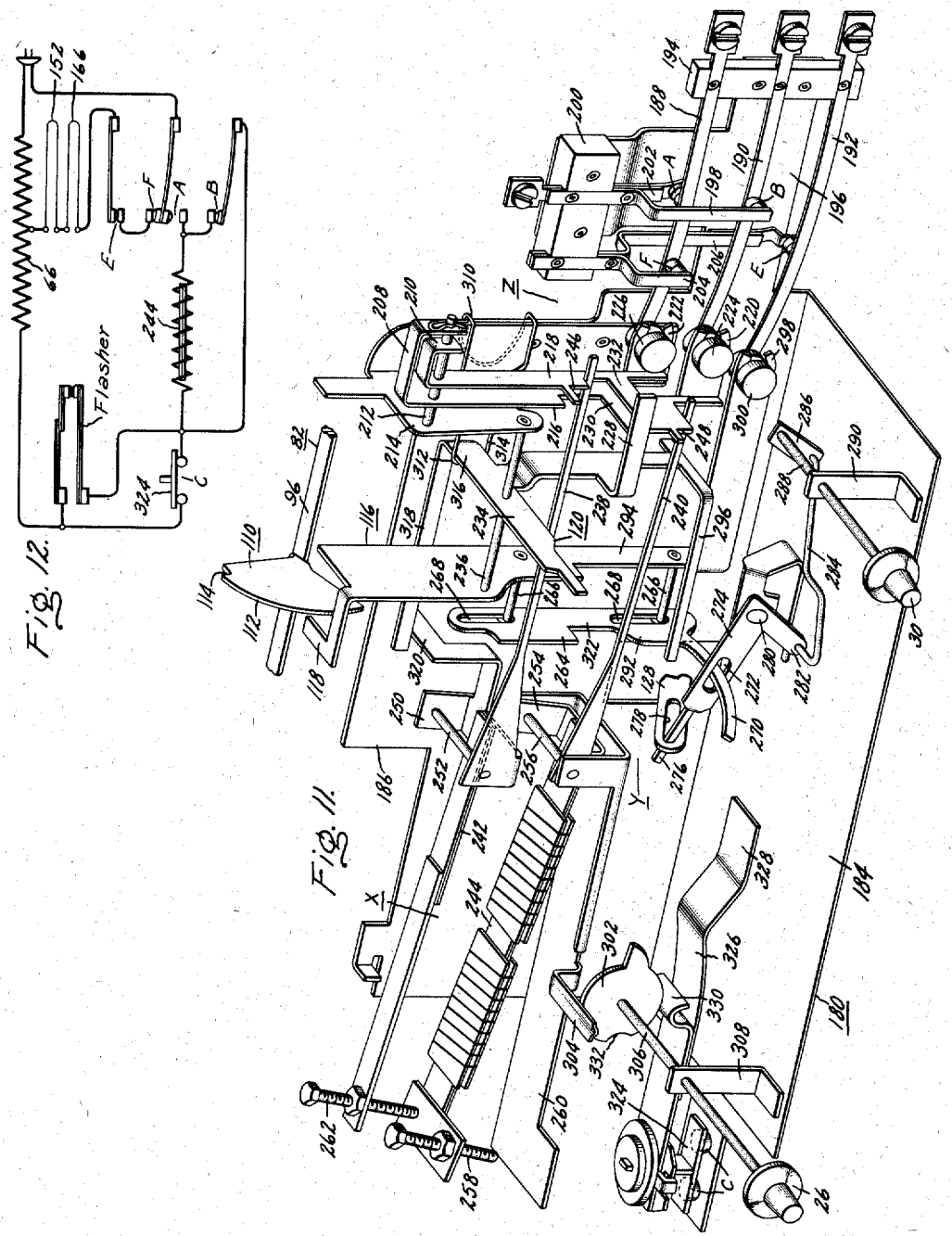

Jan. 12, 1960  W. A. SCHMALL  2,920,551
COMBINATION ELECTRIC TOASTER AND OVEN APPLIANCE
Filed March 27, 1957  9 Sheets-Sheet 8

Inventor:
Wilbur A. Schmall,
by Armand Cifelli
His Attorney.

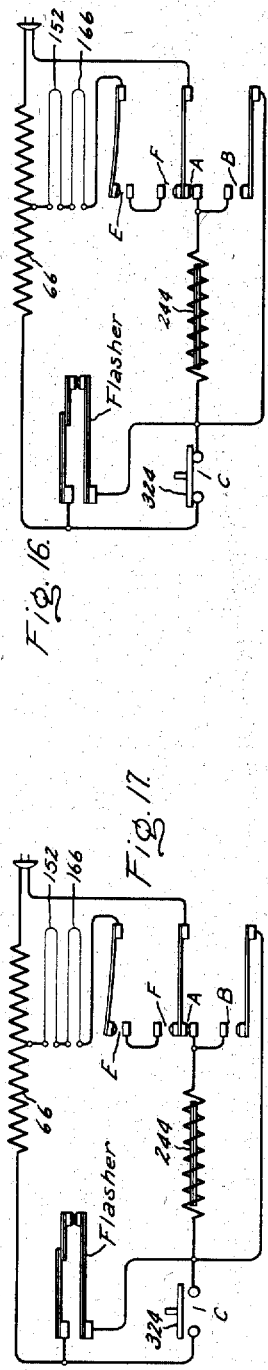
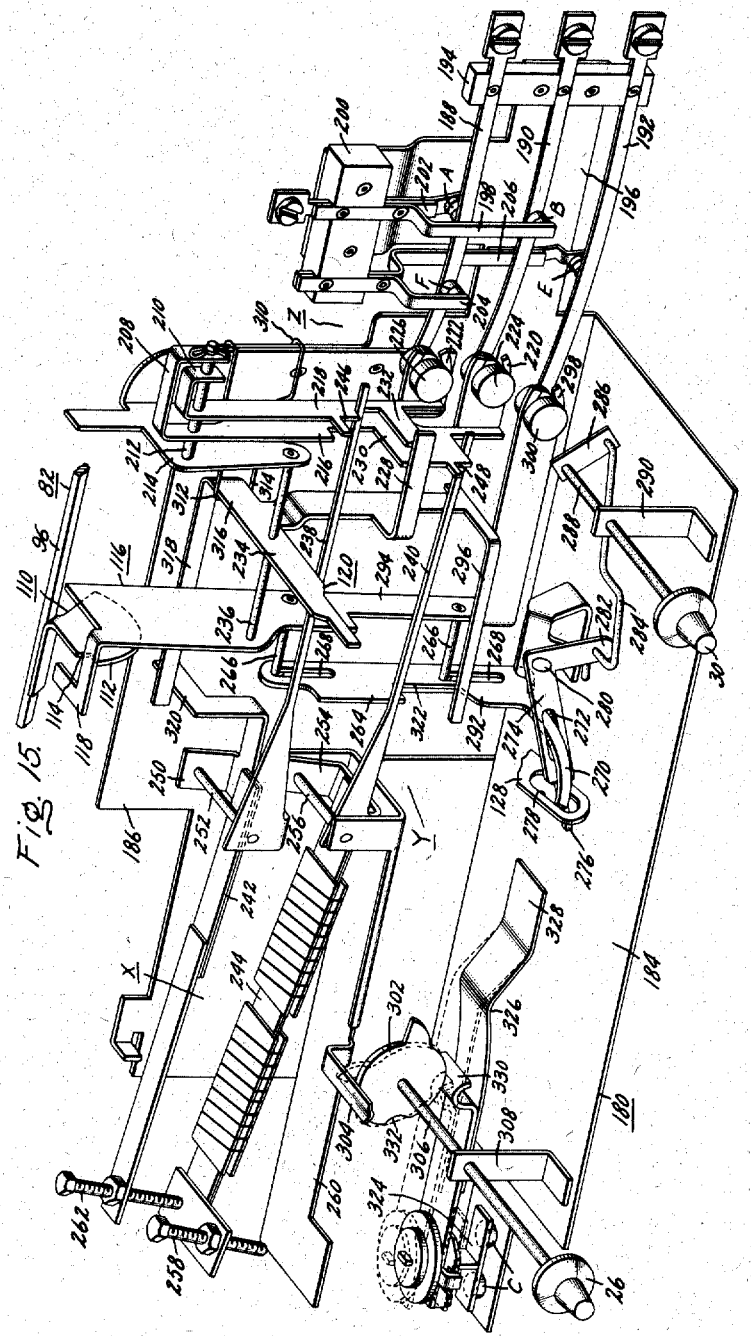

United States Patent Office 2,920,551
Patented Jan. 12, 1960

2,920,551
COMBINATION ELECTRIC TOASTER AND OVEN APPLIANCE

Wilbur A. Schmall, Allentown, Pa., assignor to General Electric Company, a corporation of New York Application March 27, 1957, Serial No. 648,903

16 Claims. (Cl. 99—329)

The instant invention, in one sense, relates to toasters, and particularly to automatic electric toasters. The invention, in another sense, relates to a combination cooking appliance which includes a portion for toasting and another portion for toasting, broiling or warming. In the latter aspect, the invention deals particularly with the means for controlling the various cooking functions of the combination cooking appliance.

The toaster prior art is replete with automatic electric toasters of the so-called "pop up" type. As is presently well known, this type of toaster generally comprises an arrangement wherein bread is inserted into vertical slots in the toaster and rests on a bread support in an upper non-toasting position; thereafter a mechanical element is manually actuated so as to move the bread support to a lower toasting position, wherein the bread support is releasably latched, an energy storage means is stressed and heating means is energized to toast the bread. When the toasting operation is completed, automatic means, usually in the form of a timer or detector, de-energizes the heating means and unlatches the bread support, and the energy storage means moves the bread support to its upper non-toasting position. It has been generally recognized recently that it is desirable to provide toasters having more fully automatic operation, and particularly to provide toasters wherein a simple actuating movement initiates the complete toasting cycle in a quick, efficient and accurate manner.

The toaster art recently has also recognized the need to improve toasters in other ways. For example, it has been desired for a long time in this art to provide a toaster wherein objects having a thickness in excess of conventional sliced bread, such as English muffins, hamburger buns and the like, might be toasted; this was not possible with most prior art toasters because the slots were too narrow. The art also has desired to provide a toaster wherein previously toasted or cooked objects might be kept warm.

It is an object of this invention to provide an improved automatic electric toaster having an improved control wherein the complete toasting operation is initiated by placing objects to be toasted on a support and pushing a pushbutton or the like.

It is a further object of this invention to provide an improved toaster of the type set forth in the preceding paragraph wherein the toaster is of the so-called "long slot" and/or "hot wire" drive type. For the purpose of this patent application, a "long slot" type toaster is one wherein two conventional slices of bread may be simultaneously mounted in a line on the bread supporting means in the toasting slot; and a "hot wire" drive type toaster is one wherein the means for lowering or raising the bread supporting means includes an expansible element, the expansion and contraction of which is utilized to cause or allow raising or lowering of the bread supporting means.

It is a still further object of this invention to provide an improved combination electric cooking appliance which is capable of functioning selectively to either toast thin or thick objects, or maintain previously toasted or cooked objects warm.

It is another object of the invention to provide an improved appliance of the type set forth in the preceding paragraph, which includes a unitary control for governing all of the operations of the appliance.

Some of the objects of this invention are accomplished in one form by the provision of an electric toaster having movable bread supporting means, electrically operated means for driving, i.e., raising or lowering, the bread supporting means, electrically operated heating means for toasting, a control for governing the operation of the driving means and the heating means, and a push-button for initiating a toasting cycle.

Other objects of this invention are accomplished in one form by the provision of a combination electric cooking appliance having a toasting chamber and an oven chamber, heating means in the area of communication between said chambers, radiant heat reflecting means in the same area for selectively directing the heat to either of the chambers, movable bread supporting means in the toasting chamber, driving means for moving the bread supporting means, a control for governing the operation of the appliance, and a pushbutton for initiating the operation of the appliance.

Still other objects of the invention are accomplished in one form by the provision of an appliance as set forth in the preceding paragraph, wherein a flasher is included which is operative when the control sets the appliance for oven chamber warming to intermittently energize the heating means and thereby maintain a predetermined warming temperature in the oven chamber.

The above and other objects, and further details of that which I believe to be novel and my invention, will be clear from the following description and claims taken with the accompanying drawings wherein:

Fig. 3 is a side elevation view, with portions cut away for the sake of clarity, of the combination electric cooking appliance shown in Fig. 1;

Fig. 4 is a perspective view of the bread supporting means and the driving means therefor removed from the toaster, but showing some of the associated toaster parts;

Fig. 5 is a somewhat schematic, perspective view of the appliance control showing the relative disposition of its parts at the beginning and end of a toasting cycle, when the control is set for toasting chamber operation, i.e., with the heat reflecting means positioned to direct heat into the toasting chamber;

Fig. 6 is a wiring diagram showing the positions of the electrical elements of the circuit when the control is disposed in the Fig. 5 condition;

Fig. 9 is a view similar to Fig. 7 showing the control parts after the bimetallic arm heater, which forms a part of the timer portion of the control, has been shorted out;

Fig. 10 is a view similar to Fig. 6, but corresponding to the Fig. 9 condition of the control;

Fig. 11 is a view similar to Fig. 9 showing the control parts after the drive ribbon contacts, which form a part of the switch portion of the control, have been closed and the main heating element contacts, which also form a part of the said switch portion, have been opened;

Fig. 12 is a view similar to Fig. 6, but corresponding to the Fig. 11 condition of the control;

Fig. 15 is a somewhat schematic, perspective view of the appliance control showing the relative disposition of the parts when the control is set for oven chamber operation, i.e., with the heat reflecting means positioned to direct heat into the oven chamber, just prior to depressing the pushbutton and starting an oven chamber toasting cycle; the parts of the control which regulate the color of the toast made and determine whether the appliance is set for oven chamber toasting or oven chamber warming are shown in dotted lines when in the positions which they occupy when the control is set for oven chamber warming, and in solid lines when in their oven chamber toasting positions;

Fig. 16 is a wiring diagram showing the positions of the electrical elements of the circuit after the control has been set for oven chamber toasting operation, illustrated in solid lines in Fig. 15, and has had its pushbutton depressed to start an oven chamber toasting cycle;

Fig. 17 is a view similar to Fig. 16 when the control is set for oven chamber warming operation, i.e., when the color regulating parts are in their dotted Fig. 15 positions.

Figure 1:
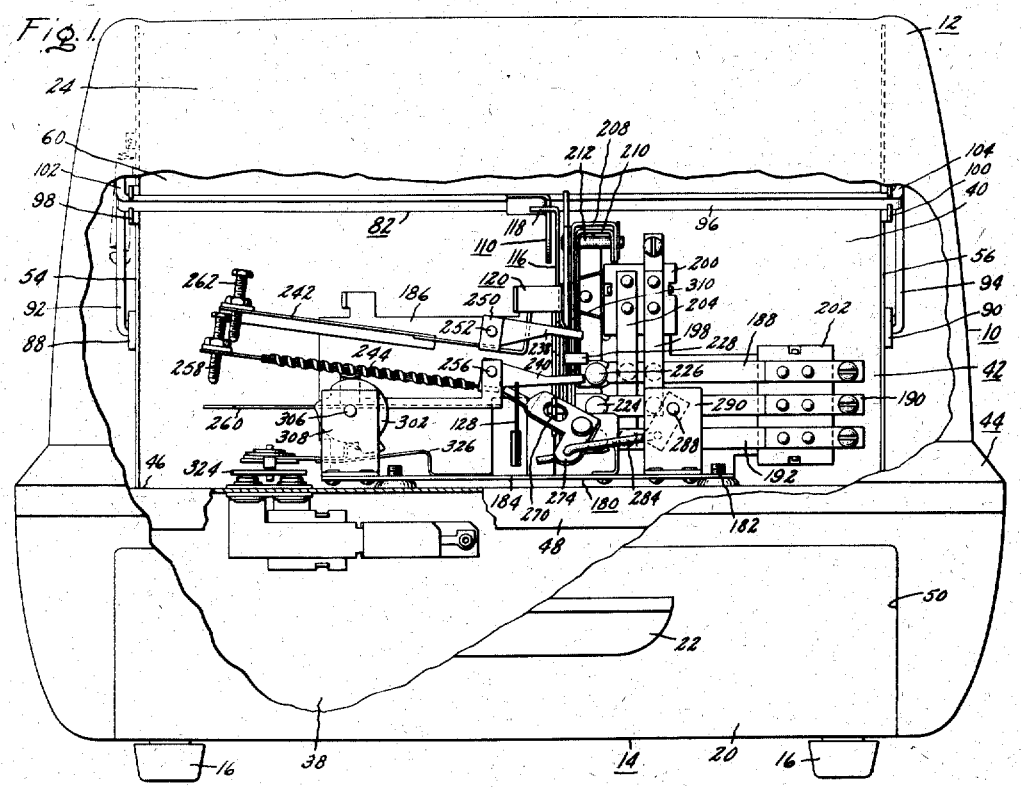
Fig. 1 is a front elevation view, with portions cut away for the sake of clarity, of a combination electric cooking appliance incorporating the invention.
Figure 2:
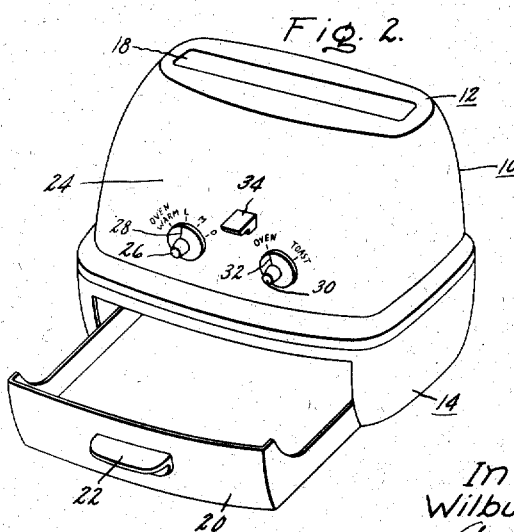
Fig. 2 is a perspective view of the combination electric cooking appliance illustrated in Fig. 1, having the oven chamber drawer shown in its opened position.

Referring to Figs. 1, 2 and 3, the combination electric cooking appliance is generally designated by reference numeral 10, and it generally comprises an upper toasting portion 12, which includes a toasting chamber, and a lower oven portion 14, which includes an oven chamber. The entire appliance may rest on a surface on its feet 16.

An elongated toasting slot 18 (in a three dimensional sense) extends vertically into the toasting portion 12, longitudinally of the appliance, and is accessible from the top thereof. The toasting slot 18 is of the long slot type, that is, it is capable of simultaneously accommodating two or more conventional bread slices in a line. The toasting portion 12, in general, is utilized normally just to toast conventional slices of bread in a manner to be described shortly.

The oven portion 14 houses a removable drawer 20 which is horizontally slidable between the closed position shown in Figs. 1 and 3, and the opened position shown in Fig. 2. The handle 22 is provided on the front of the drawer 20 to allow the drawer to be manually grasped and moved between its opened and closed positions.

On the front 24 of the toaster portion of the appliance there is mounted a plurality of manually operated, control members for selectively determining the operation of the appliance. As can best be seen in Fig. 2, these members comprise control knobs 26 and 30, and pushbutton 34. The control knob 26 comprises a combination toast color control (for toasting in either chamber) and oven chamber warming selector. It will be noted that the pointer 28 on the knob 26 may be manually positioned over "Oven Warm" or anywhere within the range between "L" and "D," which correspond to color settings between "light" and "dark," by rotating the knob 26. The knob 30 is a selector for setting the appliance for either toasting chamber operation or oven chamber operation, such selection being accomplished by moving the pointer 32 on the knob 30 to either the "Toast" or "Oven" position by rotating the knob 30. The pushbutton 34 is mounted for limited vertical movement and is capable of being pushed either upwardly (raised) or downwardly (depressed). All cooking functions of the appliance, that is, toasting in either chamber and warming in the oven chamber, are initiated by depressing the pushbutton 34. Similarly, all such functions may be interrupted at any time by raising the pushbutton.

With the appliance structure thus far described, it will be generally apparent that the combination electric cooking appliance is able to selectively perform a number of different cooking functions; the detailed structure and operation of appliance for performing these functions will be described subsequently. It is believed that a better understanding of the invention will be had if the general purposes and general manner of functioning of the appliance are set forth at this point in the specification.

The appliance is capable of operating as either: (1) a toaster for conventional bread slices (toast in the toaster chamber), (2) a toaster or broiler of thick objects (toast or broil in the oven chamber) or (3) a warming oven (warm objects in the oven chamber).

To operate as a toaster for conventional bread slices, the knob 30 is moved so that the pointer 32 points to "Toast"; this has the effect of adjusting internal mechanism (to be described later) with the result that only the toasting chamber of the appliance will be heated. The knob 26 is adjusted so that the pointer 28 points anywhere within the range of "light" through "dark," and this has the effect of adjusting a timing portion of the control so that the toasting cycle is governed to produce the desired color of toast. After the knobs 30 and 26 have been properly adjusted, the pushbutton 34 is depressed; this has the effect of unlatching a bread supporting rack which has been latched in its upper non-toasting position, and allows it to fall by gravity to a lower toasting position. Further, depressing the pushbutton also causes the heating means in the appliance to be energized and starts the timer portion of the control to operate. After the timer portion has operated to time the toasting period, it signals completion of the toast by adjusting a switching portion of the control in such a manner that the heating means is de-energized and a driving means for the bread rack is energized causing the bread rack to be elevated to its upper non-toasting position. On reaching the upper position, the bread rack is latched and the switching portion of the control is adjusted, resulting in de-energizing of the driving means.

If during the toasting chamber operation, the operator desires to terminate the toasting cycle, this can be accomplished by raising the pushbutton 34. Regardless of the time during the toasting period when this is done, it will result in deenergizing the heating means and energizing the bread rack driving means. It, therefore, will be observed that when the appliance is adjusted for a toasting chamber operation, the toasting portion thereof functions as an automatic toaster wherein the complete toasting cycle is effected by placing slices of bread into the bread slot and onto the bread rack, and depressing the pushbutton 34. Nothing more need be done to produce toast of the desired color automatically, effectively and efficiently.

If it is desired to utilize the oven chamber to either toast an object, perhaps one too thick to toast in the toasting chamber of the appliance, or to warm up an object, perhaps one which has been previously toasted or cooked, the appliance is adjusted for oven chamber operation. This is effected by moving the knob 30 so that pointer 32 points to "Oven." Such movement of the knob 30 makes internal adjustments which result in only the oven chamber being heated on subsequent energization of the heating means. It also results in internal adjustments which prevent the bread rack from falling to its lower toasting position when the pushbutton is thereafter depressed to start the oven chamber operation. If it is desired to utilize the oven chamber to toast a thick object, it is simply necessary to adjust the knob 26 so that the pointer 28 points to the color of toast which is desired.

The object is placed in the drawer 20, the latter moved to its closed position and the pushbutton 34 depressed. This initiates an oven chamber toasting cycle which is similar to a toasting chamber toasting cycle except for the fact that the toasting is done in the oven chamber. After the timer portion of the control measures the toasting period, the end of the toasting period is signaled by adjustment of the switching portion of the control which results in de-energization of the heating means. If during an oven chamber toasting operation it is desired to terminate the operation before the timed period expires, the pushbutton 34 is raised, and this results in de-energization of the heating means.

If it is desired to use the oven chamber as a warming oven to maintain objects warm therein, they are placed in the drawer 20 and it is moved to its closed position, the knob 30 is disposed so the pointer 32 points to "Oven," and the knob 26 is adjusted so that its pointer 28 points to "Oven Warming." The latter has the effect of placing into the control electrical circuit, a flasher which is designed to intermittently open and close the circuit through the heating means, and thereby intermittently energize it. This results in the heating means warming the oven chamber up to predetermined warming temperature without appreciably toasting objects therein. When it is desired to terminate oven chamber warming, the pushbutton 34 is raised, and this has the effect of de-energizing the heating means. Should the flasher become frozen in closed condition during an oven chamber warming operation, due to the circuitry of the appliance, the timer portion will go through a normal timing sequence and then de-energize the heating means. It will, therefore, be apparent that the flasher is designed to operate in such a manner that the timer portion normally does not go through a complete timing sequence unless the flasher becomes frozen.

With the foregoing functional attributes of the appliance in mind, an understanding of the detailed construction of the appliance will be had by reference particularly to Figs. 1 and 3. It will there be seen that the appliance generally comprises the toasting chamber 36, the oven chamber 38, and a control chamber 40. All of the foregoing chambers are formed by the toaster chassis 42 and a two-part casing 44. The toaster chassis 42 generally comprises a horizontal wall 46 that has a depending peripheral skirt 48 and supports the toasting chamber 36 on its upper side. It will be observed particularly from Fig. 3 that the oven chamber 38 generally is formed below the horizontal wall 46 of the toaster chassis, and the toasting chamber 36 is formed centrally above said horizontal wall by a wall structure to be described presently. There is a space between the casing 44 and the toasting chamber structure above the horizontal wall 46. Although most of the space is utilized to house portions of operating mechanism, the previously referred-to control chamber 40 is arbitrarily considered to be the space between the front of the appliance, namely, the portion through which the control knobs and pushbutton extend, and one side of the toasting chamber structure.

The previously mentioned drawer 20 is slidably received in the oven chamber 38 through the opening 50 in the lower front side of the casing. On the rear side of the casing, a gripping member 52 is mounted. The knobs 26 and 30, the pushbutton 34, the feet 16, the drawer handle 22 and the gripping member 52 may all be made of a heat insulating material, such as one of the available plastic materials. The appliance may be lifted by gripping the handle 22 and the gripping member 52.

The toasting chamber 36 is formed by a pair of end walls 54 and 56, a pair of side walls 58 and 60 and a top wall 62, which has an elongated opening 64 which surrounds the slot 18. Within the toasting chamber, there are located bread guiding means and bread toasting means, both of which may take various forms. The bread guiding means and bread toasting means may be those disclosed and claimed in my co-pending patent application serial No. 474,137, filed December 9, 1954, now Patent No. 2,862,441, issued December 2, 1958, and assigned to the assignee of the instant application. Reference to my copending application will reveal a detailed explanation of one desirable arrangement which will be briefly disclosed in the instant application.

The illustrated arrangement comprises an elongated heating element 66 which extends between the end walls 54 and 56 in the general area of an opening 63 which is formed in the horizontal wall 46 and places the toasting chamber and oven chamber into communication with each other. The heating element 66 may comprise an elongated bar of electrical insulating material having electrical resistance wire wrapped around it, and it may be appropriately wired in the appliance control circuit for energization at the proper time. Extending above and parallel to the heating element 66 is a heat baffle 70 in the form of an elongated metal plate. A plurality of bread guard wires 72 depend from the top wall 62 and are secured in any conventional manner to the heat baffle 70. It will, therefore, be apparent that within the space in the toasting chamber defined generally by the bread guard wires 72, the heat baffle 70 and the opening 64, slices of bread or the like may be received for toasting, and that essentially comprises the toasting slot 18.

It is desirable to provide in the toasting chamber 36 bread supporting means which will permit bread slices or the like to be disposed in either a toasting position or a non-toasting position, in order that they may be placed on said supporting means, moved to toasting position, toasted, moved to non-toasting position, and removed at will. A particularly effective bread supporting means which could be readily incorporated in the instant appliance is disclosed in the co-pending patent application of Alfred E. DeMott, Serial No. 648,902, filed concurrently herewith, now Patent No. 2,870,701, issued January 27, 1959, and assigned to the assignee of the instant application. For a detailed disclosure of one highly effective bread supporting means, reference should be had to the co-pending DeMott application, however, it will be briefly described here. The bread supporting means generally comprises a bread rack and a bread rack supporting mechanism. The bread rack comprises an elongated substantially flat plate 74 which may be formed by a plurality of shallow, V-shaped members, as illustrated, and which is disposed for vertical movement in the toasting slot 18 in the toasting chamber 36, and has secured thereto a bread rack rod 76 which extends beyond each end of the bread rack and passes through vertical slots formed in the end walls 54 and 56 of the toasting chamber, where the free ends 78 of the bread rack rod are bent upwardly, all as can best be seen in Figs. 3 and 4.

At each end of the toasting chamber 36 there are located portions of the bread rack supporting mechanism which are designated control linkage assemblies. Each of the control linkage assemblies comprises an arrangement of mechanical elements disposed generally in accordance with the principles of Watt's Motion. The entire bread rack supporting mechanism comprises four members which provide both Watt's Motion control linkage assemblies; the bread rack supporting mechanism comprises two generally similarly shaped control arms 80 and 82, each of which is generally U-shaped, and a pair of control links 106 and 108.

Control arm 80 is designated as the lower control arm and includes an elongated central portion 86 pivotally supported near its ends by the tabs 88 and 90 which are formed on the end walls 54 and 56, respectively, and a pair of control legs 92 and 94 which are generally normal to the central portion 86. Control arm 82 is designated the upper control arm, and includes the central portion 96 which is pivotally supported near its ends by the tabs 98 and 100 which are formed on the end walls 54 and 56, respectively, and a pair of control legs 102 and 104 which are generally normal to the central portion 96.

It will be apparent that the control arms 80 and 82 are supported by their associated tabs in such a manner that their central portions are spaced from and parallel to the side walls 58 and 60, respectively, of the toasting chamber 36, and their control legs generally reside in planes which are generally parallel to and spaced from the end walls 54 and 56 of the toasting chamber. The free ends of all of the control legs are bent substantially at right angles away from their associated end walls and are pivotally received in openings in the control links 106 and 108, which connect the ends of the control legs. Specifically, adjacent the end wall 54, the control link 106 has a pair of openings, one near each end thereof, which receive the bent free ends of the control legs 92 and 102. Adjacent the end wall 56, the control link 108 is disposed and it has a pair of openings, one near each of its ends, which receive the bent free ends of the control legs 94 and 104.

It should, therefore, be apparent that each control linkage assembly comprises a pair of pivotal control legs and a control link. The control links each have a central opening which pivotally receives one of the bent ends 78 of the bread rack rod. With the construction described thus far, it will be apparent that the bread rack 74 is supported on the bread rack rod 76, which in turn has upwardly bent ends 78 which are pivotally received in central openings in the control links 106 and 108, and that the latter are supported by the free bent ends of the control legs. Further, it will be apparent that the control arms 80 and 82 are pivotally supported in the tabs 88 and 90, and 98 and 100, respectively, and that pivoting of the control arms results in swinging movement of the control legs and oscillation of the control links in such a manner that the central openings in the control links describe a substantially vertical path between their lower limit of movement and their upper limit of movement. It should, therefore, be apparent that by moving one or both of the control arms, movement of the mechanical elements of the bread rack supporting mechanism, including both control linkage assemblies, results, and this movement has the ultimate effect of moving the bread rack vertically up or down within the limits of the toasting slot.

In the drawings there is also illustrated an arrangement for driving the bread rack from its lower position to its upper position, which is of the "hot wire" type. A particularly effective bread rack driving means which could be readily incorporated in the instant appliance is disclosed and claimed in the co-pending joint patent application of Messrs. Kropp, DeMott and myself, Serial No. 648,901, filed concurrently herewith and assigned to the assignee of the instant application. For a detailed consideration of one highly effective bread rack driving means, reference should be had to the last mentioned co-pending application, however, it will be briefly described here.

The bread rack driving means illustrated is particularly effective when utilized with the described bread rack supporting mechanism, because of the fact that the bread rack supporting mechanism is extremely light in weight and includes a minimum of frictional resistance. In the illustrated toaster portion of the appliance, the bread rack is allowed to move from its upper non-toasting position to its lower toasting position by the force of gravity. Therefore, in order to lower the bread rack it is solely necessary to allow the force of gravity to become operative on the bread rack, as by unlatching the bread rack supporting mechanism. This is accomplished in the illustrated embodiment (see Figs. 3 and 4) by the provision of a segmental latch 110, which is rigidly secured to the central portion 96 of the control arm 82. The latch 110 has a smooth, arcuate edge 112 and a notch 114 formed at one end of the edge. Disposed adjacent to the latch is the latching bar 116 which is pivotally supported centrally of its ends and has a latching detent 118 formed at its upper end which is adjacent to the latch 110. The latching bar 116 is normally biased to pivot in a direction such that the latching detent 118 is biased toward the latch 110.

When the bread rack 74 is in its upper position, the latching detent 118 is located in the notch 114 (see Fig. 1). The weight of the bread rack and its supporting mechanism is such that it is urged downwardly, but restrained from downward movement by the interference between the latching detent 118 and the portion of the latch around the notch 114. To lower the bread rack 74, the latching detent 118 is moved out of the notch 114 by depressing the pushbutton 34, which through the linkage of the control member 120 and the latching bar 116 effectuates the desired movement of the latching detent 118. When the latching detent 118 clears the arcuate edge 112, the latch 110 swings downwardly and the control arms pivot in their supporting tabs, resulting in movement of the control legs and control links and, hence, the bread rack 74 to their lower positions. Such movement causes adjustment of internal parts, particularly in the control, which will be described subsequently.

When the bread rack 74 reaches its lower position, the bread slices are in toasting position and the control energizes the heating element 66, which radiates heat energy to toast the bread. By reference to Fig. 3, it will be seen that a pair of planar flappers 122, 124 are provided for reflecting heat energy emitted from the heating element 66 either upwardly into the toasting chamber 36 or downwardly into the oven chamber 38. For a general understanding of the operation of the flappers, reference should be had to my referred-to, co-pending patent application, Serial No. 474,137, filed December 9, 1954, now Patent No. 2,862,441, issued December 2, 1958; and for a detailed understanding of the construction and operation of the flappers, reference should be had to my co-pending patent application, Serial No. 598,393, filed July 17, 1956 and asigned to the assignee of the instant application. For an understanding of the present invention, it is solely necessary to realize that flappers 122, 124 are pivotally mounted at their outer edges in an appropriate manner to the lower portions of the side walls 58 and 60, and that they are adjustable between two extreme positions, a lower and an upper position. In the lower position, which is illustrated in Fig. 3, their inner edges contact a reflector plate 126, which is rigidly secured to the end walls 54 and 56; in this position, radiant heat energy emitted from the heating element 66 is reflected upwardly into the toasting chamber 36 to toast the bread positioned therein. In their upper position, the inner edges of the flappers contact lower side portions of the baffle 70, and they reflect radiant heat energy emitted from heating element 66 downwardly into the oven chamber 38.

Movement of the flappers 122 and 124 is caused by actuating the flapper lever 128, as by moving it up or down in a generally vertical plane to thereby cause pivoting of the flappers. The direct pivoting of flapper 122, which results from moving the lever 128, is transmitted to the flapper 124 by an appropriate motion transmitting member, which may take the form of a spring which both transmits the motion from one flapper to the other, and urges the flappers into either extreme position in which they may be located. Such a spring is set forth in detail in my last referred-to, co-pending patent application.

It will, therefore, be apparent that the position of the flappers determines whether or not heat is reflected upwardly for toasting chamber operation or downwardly for an oven chamber operation. Therefore, by making an appropriate mechanical connection between the flapper lever 128 and the knob 30, the turning of the knob will result in the adjustment of the flappers in said appliance into position for either a toasting chamber or an oven chamber operation.

Assume the flappers are in position to provide for a toasting chamber operation, the bread rack has fallen by gravity to its lower position, and the heating element 66 is energized; radiant heat energy is directed upwardly and it will toast the bread placed on the bread rack; the control will terminate the toasting period by de-energizing the heating element at the appropriate time and also make an adjustment in its switch portion which will energize the bread rack driving means to drive the bread rack to its upper position. To effect such movement of the bread rack, the crank 130, which is formed in the central portion 86 of the control arm 80 is moved downwardly. The downward movement of the crank 130 results in both of the control arms being pivoted in their supporting tabs, and the control links being moved upwardly; the overall effect of this movement is to cause the bread rack 74 to be raised from its lower to its upper position. When the bread rack reaches its upper position, the latching detent 118 enters the notch 114 to latch the bread rack 74 in its upper position, and the bread rack driving means is de-energized by another adjustment in the control switch portion.

The bread rack driving means is best illustrated in Fig. 4, wherein it is shown in association with the bread supporting means removed from most of the remaining toaster portion structure. The principal portions of the bread rack driving means are located below the horizontal wall 46 and within the skirt 48; for clarity, the wall and skirt have not been illustrated in Fig. 4. The bread rack driving means will be explained only generally for the purpose of insuring an understanding of one particular arrangement which is operative in the instant appliance. The bread rack driving means comprises the bell crank 132, the bell crank link 134, which operatively connects the bell crank to the crank 130, and the associated parts for causing movement of the bell crank in a desired manner to lower the bell crank link at the proper time to thereby lower the crank and actuate the break reack supporting mechanism to raise the bread rack to its upper position.

The bell crank 132 is pivotally secured to one side of the toaster chassis on a pivot pin 136. The bell crank is generally of triangular configuration and is pivoted on an axis which falls generally between two corners of the triangle. One corner 138 of the triangle pivotally supports one end of the bell crank link 134; another corner 140 has a lateral tab 142 which supports one end of a coil spring 144, the other end of which is rigidly, but adjustably, secured to the toaster chassis by a threaded rod and nut assembly 146. The last corner 148 of the triangle supports a transverse stub shaft 150, around which is wound a set of metal drive ribbons 152. The free ends of the ribbons are secured to hook-like connectors 154, which in turn operatively engage a vertically oriented, stub shaft 156, which is supported by one side of a yoke member 158. The yoke member is supported on the vertical pin 160 for pivotal movement about a vertical axis. The other side of the yoke member supports a vertically oriented, stub shaft 162, which in turn operatively engages hook-like connectors 164, which are secured to the free ends of a second set of metal drive ribbons 166, which are supported about the transverse stub shaft 168, which in turn is supported on an adjustable bracket assembly 170.

The bread rack driving means just described operates at the appropriate time to lower the bell crank link 134 in the following manner. At the time during toasting chamber operation when the bread rack has been moved to its lower position, the bread has been toasted and the heating element has been de-energized, the condition of the bread rack driving means is as follows: the metal drive ribbons 152 and 166 are relatively cold and taut, in fact, they are in tension, which is caused by the relatively powerful coil spring 144, which is stressed, acting through the bell crank 132. The disposition of the parts is as illustrated in Fig. 4. At the appropriate time, that is, when it is desired to raise the bread rack, the metal drive ribbons are allowed to expand in response to being heated; the heating may be the result of the metal drive ribbons having current transmitted through them, as is the case in the co-pending application of Messrs. Kropp and DeMott and myself. Regardless of whether the ribbons are directly or indirectly heated, the desired result is to cause them to expand rapidly at the proper time. The net linear expansion of each set of ribbons is added by the yoke member and results in allowing the coil spring to contract, thereby pivoting the bell crank 132 clockwise as viewed in Fig. 4. Such movement of the bell crank 132 has the effect of causing the corner 138 of the bell crank to move downwardly, to thereby move the bell crank link 134 and the crank 130 downwardly. This causes the bread rack supporting mechanism to be actuated to raise the bread rack 74 by pivoting the control arm 80 and, hence, the entire bread rack supporting mechanism functions to raise the bread rack.

When the bread rack reaches its upper position, it is latched and the bread rack driving means is de-energized and allowed to cool and resume its original position. When this occurs, the bell crank link 134 is moved upwardly, but because of the lost motion connection between it and the crank 130, no affect on the bread rack or its supporting mechanism is made. The bell crank link 134 is simply poised and ready to operatively engage the crank 130 when the bread rack is subsequently lowered, in the anticipation of thereafter lowering the crank 130 to actuate the bread rack supporting mechanism and raise the bread rack at the proper time.

Much of the foregoing disclosure relates to the structure and operation of the toasting portion of the appliance. The appliance is also capable of performing a variety of cooking or heating functions in the oven chamber 38. As was previously mentioned there are two general types of operations that may be conducted in the oven chamber; namely, (1) broiling or toasting and (2) warming.

(1) In order to broil or toast an object, for example, a thick one too large to toast in the toasting chamber, such as an English Muffin, the object is placed in the oven drawer 20 and the latter slid into closed position, the appliance's flappers 122 and 124 are adjusted to their "Oven" position, i.e., upper position wherein they direct the heat emitted from the heating element 66 downwardly, the knob 26 is adjusted to the color of toast desired, and pushbutton 34 is depressed to start the broiling or toasting operation in the oven chamber. During broiling in the oven chamber, the timing portion of the control, which will subsequently be described in great detail, times the toasting period in somewhat the same manner as it does for a toasting operation being performed in the toasting chamber. When it completes its timing function, it signals the completion by simply de-energizing the heating element 66, because raising and lowering the bread rack 74 is unnecessary when performing an oven chamber operation. The control is constructed so as to eliminate both the raising and lowering of the bread rack when performing an oven chamber operation and, therefore, the bread rack driving means is not energized normally during an oven chamber operation.

(2) In order to perform an oven warming function, the appliance is set for "Oven" operation, the object to be kept warm is placed in the oven chamber, and the control knob 26 is set for "Oven Warming." In this position, a flasher is placed into the circuit of the heating element; stated differently, the flasher is normally shorted out of the circuit for all cooking operations other than oven chamber warming. The flasher is best illustrated in Fig. 1 and comprises a pair of contact carrying blades which are designed and constructed so as to intermittently open and close the heating element circuit. For a complete understanding of the detailed flasher construction, reference should be had to P. M. Kropp, Jr.'s and my co-pending patent application, Serial No. 605,036, filed August 20, 1956, and assigned to the assignee of the instant application. For the purposes of the present invention, it is solely necessary to understand that when the flasher is in the heating element circuit, it will cause intermittent energization of the heating element in response to its thermal condition.

In view of the foregoing, it is apparent that a control is necessary for governing all of the many cooking functions that the appliance is capable of performing. Specifically, the control must provide: for "Oven" or "Toast" operation, and in order to do so, it must provide for selective positioning of the flappers; control of the bread rack and its supporting mechanism to insure that the bread rack is not lowered or raised for oven chamber operation, and yet is lowered during toaster chamber operation, and it must provide for either a timed toasting period (in either chamber) with appropriate provision for selection of the desired color (either light, medium or dark toast) or an oven warming operation (wherein the flasher is in the heating element circuit). Furthermore, it is extremely desirable that the control provide for initiation of all cooking functions by depressing the push-button, and also provide for the selective termination of all cooking functions at the will of the user by raising the push-button.

The detailed construction and operation of a control for governing an appliance capable of performing all of the foregoing cooking functions will now be described. In order to fully understand the control, it is best to first generally understand the electrical functions which the control must perform.

Referring to Fig. 6, there is illustrated a wiring diagram for the appliance with the various elements of the control being illustrated in the positions which they occupy when the appliance is set for toasting chamber operation, and the bread rack is in its upper position at the start of the toasting cycle. For a typical toasting chamber operation, the pushbutton 34 is depressed, and this results in setting the timer portion of the control, which includes a timer of the "heat-up, cool-down bi-metal" type, by closing the contacts at "A" and opening the contacts at "B"; depressing the pushbutton also unlatches the latch 110 and allows the bread rack 74 to move to its lower position, and this causes the contacts at "E" to be closed, for they are held closed by the latch bar 116 whenever the bread rack is in its lower position, except on "Oven" operation. Therefore, electric current flows through the bimetallic arm heater which forms a part of the timer, through the main heating element 66 and back to the line. The timer bimettalic arm upon being heated by the timer bimetallic arm heater deflects in such a manner that at a predetermined temperature, an adjustment is made, allowing the contacts at "B" to close. When the contacts "B" are closed, current no longer flows through the timer bimetallic arm heater, and the timer bimetallic arm is allowed to cool. Upon cooling to a predetermined extent, another adjustment is made, allowing the contacts at "A" to open and the contacts at "F" to close. Current then flows through the drive ribbons, through half of the main heating element, which acts as electrical ballast and back to the line. During this short period, the drive ribbons heat rapidly and expand, and allow the bread rack to be returned to its upper position. When the bread rack reaches its upper position, it is latched and the contacts at "E" are allowed to open; contacts "E" are always open when the bread rack is latched in its upper position. Thus, the main heating element and drive ribbons are de-energized and the toasting chamber cycle is completed.

For a typical oven chamber toasting operation, the flappers are adjusted to their oven chamber position by moving the pointer of knob 30 to "Oven," and the push-button is depressed. Referring to Fig. 6 again, depressing the pushbutton results in the contacts "A" being closed and the contacts "B" being opened. The timer again goes through its heat-up, cool-down sequence, and ultimately opens the contacts at "A" and closes the contacts at "F" at the end of the timed toasting period. On oven chamber operation, however, the pushbutton does not drop the bread rack and, therefore, contacts "E" remain open throughout the oven chamber operation. Therefore, on oven chamber operation, the drive ribbons are normally not energized at all, but the main heating element is energized for the period determined by the timer. There is a chance that the operator will depress the pushbutton while on the "Toast" setting, and then switch to "Oven" setting or to "Oven Warm" operation, in which case the bread rack will have initially fallen. However, no serious problem will result, for the bread rack will simply be returned to its upper position at the completion of the timed period, when the toasting cycle is automatically terminated by the timer or interrupted by manually raising the pushbutton.

For oven chamber warming operation, the appliance is adjusted for "Oven" operation, and the knob 26 is adjusted so that its pointer 28 is set at "Oven Warming." This latter adjustment results in disengaging the shorting bar from the contacts "C," such that the contacts "C" are opened. When the pushbutton is depressed, the same electrical connections are made as are made when an oven chamber toasting operation transpires, but the current now flows through the flasher. The flasher is designed in such a manner that it cycles the main heating element "On" and "Off" at such a frequency that the timer remains on heat-up, and contacts "A" remain closed and contacts "B" remain opened throughout oven chamber warming. Should the flasher fail and remain "On," then the timer will go through a heat-up, cool-down, sequence and de-energize the heating element at the end thereof. The oven chamber warming operation will normally continue until the pushbutton is manually raised.

With the foregoing general cooking functions and specific electrical control functions in mind, the construction and operation of the control will more readily be understood and will now be set forth in detail. Referring to Fig. 5, which reflects the mechanical positioning of the control elements when the electrical circuit is in the Fig. 6 wiring diagram condition, it will there be seen that the control generally comprises a unitary assembly which is mounted principally on a generally L-shaped bracket member 180. From Figs. 1 and 3, it will be observed that the control unit is secured in the control chamber of the appliance to the toaster chassis by a plurality of threaded connections 182. The control bracket includes a generally horizontal bottom wall 184 and a generally vertical back wall 186 which is juxtaposed to the outer side of the toasting chamber side wall 60. Throughout the description of the control, the back wall 186 will be used as a reference plane. For the purpose of convenience and to facilitate an understanding of its construction and operation, the control may be arbitrarily considered to comprise three cooperating portions as follows: the timer portion X, the control portion Y, and the switching portion Z which have been generally alluded to above.

Starting with the switching portion Z and referring particularly to Fig. 5, it will there be seen that three flexible, elongated, horizontally extending, vertically spaced, contact blades 188, 190 and 192 are secured near their terminal ends (right-hand ends in Fig. 5) to an insulating block 194, which in turn is secured to an offset portion 196 of the back wall 186 of the control bracket. It will be observed that contact blade 188 supports one of the contacts "A" on one of its sides, and one of the contacts "F" on its other side. Contact blade 190 supports one of the contacts "B" on one of its sides. Contact blade 192 supports one of the contacts "E" on one of its sides. Rigid, vertically depending, contact blade 198 supports the other contact "B" at its lower end, and is rigidly secured at its upper end to an insulating block 200. Another rigid, vertically depending, contact blade 202 is secured to the insulating block 200 at its upper end. Contact blade 202 near its upper end is in electrical contact with the upper end of contact blade 198, and at its lower end carries the other contact "A." Another pair of rigid, vertically depending, contact blades 204 and 206 are mounted at their upper ends to the insulating block 200, have their upper ends in electrical contact and at their lower ends support the other contact "F" and the other contact "E," respectively. It should be noted that each of the flexible contact blades 188, 190 and 192 has a terminal end for connection of appropriate electrical wiring, and that the rigid contact blades 198 and 202 have a terminal portion formed at their upper ends for the same purpose.

In order to make the appropriate adjustments of the flexible contact blades at the proper time, the free end (the left-hand end in Fig. 5) of each of the flexible contact blades cooperates with an insulating button which is adapted to stress and deflect the contact blade toward the back wall 186 against the normal resistance of the flexible contact blades. If no external force is imposed on them, each of the flexible contact blades 188, 190 and 192 would normally be unstressed, and spaced from and generally parallel to the back wall 186 and, therefore, close contacts "B" and "F," and open contacts "A" and "E." This is the initial condition of the contacts when the bread rack is in its upper position and the appliance is set for toasting chamber operation (see Figs. 5 and 6).

The three flexible contact blades 188, 190 and 192 are adapted to be held separately and individually in their deflected positions by insulating buttons which are carried by the yokes 208 and 210 and the latching bar 116, respectively. The yokes are operatively associated with elements of the timer portion X in such a manner that when the flexible contact blades 188 and 190 are deflected by the yokes, the yokes are adapted to have movement urged by the bias of the flexible contact blades restrained by the elements of the timer portion. The yokes 208 and 210 are each generally L-shaped and have upper U-shaped portions that are adapted to be pivotally mounted on a horizontally oriented pin 212, which is rigidly connected to a forwardly extending wall portion 214 which is offset from the back wall 186 of the control bracket. The yokes 208 and 210, respectively, have downwardly depending legs 216 and 218 which are appropriately notched to cooperate with the referred-to timer elements; the legs 216 and 218, respectively, support laterally extending tabs 220 and 222 which, in turn, respectively support insulating buttons 224 and 226 which, in turn, respectively cooperate with the free ends of the flexible blades 190 and 188. It will, therefore, be apparent that by forcing the depending legs of the yokes toward the back wall 186, their insulating buttons will force the free ends of the flexible contact blades 190 and 188 toward said wall and thereby cause the contacts at "B" and "F" to open, and the contacts at "A" to close, and that the flexible contact blades 190 and 188 will be stressed and deflected out of their normal positions and will urge the insulating buttons 224 and 226 away from the back wall 186.

The depending legs of the yokes are urged away from the back wall 186 by the flexible contact blades 188 and 190 when the latter are deflected. However, they are adapted to be pushed toward the back wall by the horizontally extending arm 228 which is formed on the pivotal control member 120, and which is adapted to cooperate with the forwardly extending portions 230 and 232 formed on the legs 216 and 218, respectively. It will, therefore, be apparent that pivoting the control member 120 about its supporting pin 236, which is rigidly secured to the wall 214, counterclockwise as viewed in Fig. 5, as by depressing the pushbutton 34 which is rigidly attached to the pushbutton lever 234 which forms a part of the control member, will result in the extending arm 228 engaging the extending yoke leg portions 230 and 232, and forcing them toward the back wall 186. After forcing yoke leg portions 230 and 232 toward the back wall, on release of the pushbutton, the extending arm 228 moves away from said portions and the back wall as a result of the manner in which control member 120 is mounted, which mounting will be described in detail subsequently.

When the yoke legs 216 and 218 are moved toward the back wall 186, the cooperating elements of the timer portion are received in notches in the yoke legs, and thereby restrain movement of the yokes away from said back wall, and maintain the flexible contact blades 190 and 198 in their stressed, deflected condition. The timer portion elements referred to are the extending tips 238 and 240 which are respectively formed on the right-hand sides of the compensator arm 242 and the bimetallic arm 244, both of which are part of the timer portion, and which respectively cooperate with notches formed in the yoke legs 218 and 216. By reference to Fig. 7 it will be seen what the disposition of the parts is after the pushbutton has been depressed and the yoke legs have been moved toward the back wall 186; it will there be seen that the tips 238 and 240 have been received in the notches 246 and 248, respectively, formed in the legs 218 and 216, respectively, and that the arm 228 is spaced forwardly from the portions 230 and 232. When in the notches, the tips prevent forward movement of the yoke legs. It may be of interest to note that the tips are moved into the notches when the pushbutton is depressed, because when the latter occurs the yoke legs are moved toward the back wall, and the supporting arms 242 and 244 are free to pivot about their horizontal axes due to their weight distribution which is such that the tips are urged to rotate in a counterclockwise direction about said axes and, hence, move upwardly into the notches. As viewed in Fig. 5, it will be seen that the compensator arm 242 is rigidly secured to the U-shaped bracket 250, the upstanding walls of which are pivotally received on the horizontal pivot pin 252 which is rigidly secured to the back wall 186, and that the tip 238 is rigidly secured to one of the upstanding walls, and that the bimetallic arm 244 is rigidly secured to the U-shaped bracket 254, the upstanding walls of which are pivotally mounted on the horizontal pivot pin 256 which is rigidly secured to the back wall 186, and the tip 240 is rigidly secured to one of the upstanding walls.

In view of the foregoing, the manner in which the flexible contact blades 188 and 190 are adjusted when the pushbutton is depressed will be apparent. After being stressed and deflected, the flexible contact blades 188 and 190 are individually allowed to return to their undeflected condition by the separate action of the tips 238 and 240, as a result of the heat-up, cool-down sequence of the timer in the timer portion X. Assuming the parts are in the positions shown in Fig. 7, flexible contact blades 188 and 190 are individually returned to their unflexed condition by, first, the bimetallic arm 244 bowing upwardly in response to being heated by its heater, which results in the adjustably mounted screw 258 contacting the color control plate 260, and then on further bowing of the bimetallic arm causing the tip 240 to move downwardly. After a sufficient amount of movement, that tip 240 clears the notch 248, and the yoke leg 216 moves away from the back wall 186 due to the bias of the flexible contact blade 190. This results in the contact "B" being closed (see Fig. 9) and the bimetallic arm heater consequently being shorted out; the bimetallic arm begins to cool and unbow, resulting in upward movement of the end of the bimetallic arm that supports the adjustable screw 258. On a sufficient amount of cooling, the adjustable screw 262, which is carried by the free end of the compensator arm 242, is contacted by the free end of the bimetallic arm 244, and the compensator arm is pivoted clockwise; this ultimately results in the tip 238 moving downwardly and clearing the notch 246 and allows the yoke leg 218 to move away from the back wall 186 due to the bias of the flexible contact blade 188 into the position shown in Fig. 11, which results in the contacts "A" being opened and the contacts "F" being closed. This has the effect of de-energizing the main heating element and energizing the drive ribbons.

In view of the foregoing, the manner in which the flexible contact blades 188 and 190 are first jointly moved toward back wall 186 to make desired switch adjustments, and then allowed to individually move away from said back wall to make further switch adjustments, will be apparent. Briefly, depressing the pushbutton causes the control member 120 to pivot counterclockwise and force (through its extending arm 228) the yoke legs 216 and 218 and the flexible contact blades 188 and 190 toward the back wall 186, in which position the yoke legs are urged forwardly by said blades, but restrained from forward movement by the tips 238 and 240, which due to the weight of their supporting arms, pivot counterclockwise (when the pushbutton is depressed) and enter the notches 246 and 248, respectively; thereafter clockwise movement of said tips, which is caused by the individual clockwise pivoting of the bimetallic arm and compensator arm, allow, first, the flexible contact blade 190, and then the flexible contact blade 188 to return to their original forward positions by causing said tips to be individually moved downwardly out of their associated notches in the yoke legs.

Depressing the pushbutton, and thereby pivoting control member 120, also has the effect of unlatching the latch 110, if the flappers are in "Toast" position. When so positioned, the flapper lever 128 is in its upper position (see Fig. 5), and the slide 264, which is slidably secured to the lower portion of the latch bar 116 by virtue of the pins 266 and slots 268 connections, is in its upper position. This obtains because the slide 264 has an arcuate finger 270 which extends away from the back wall 186, and is received in slot 272 formed in one leg of the pivotal, adjusting bell crank 274. The slotted leg of said bell crank has an extending finger 276 at its free end which is received in the slot 278 formed in the free end of the flapper lever 128. The bell crank 274 is pivoted at 280, and has secured to its other leg 282 one end of a connecting rod 284, the other end of which is secured to the lug 286, which in turn is rigidly secured to the rod 288, which is pivotally mounted in the L-shaped bracket 290, and has the adjusting knob 30 secured at its free end on the exterior of the appliance casing.

Rotation of the adjusting knob 30 results in rotation of the rod 288 and movement of the control rod 284 to either one side or the other. Such movement pivots the bell crank 274 about its pivot point 280 and results in the finger 276 being moved either upwardly or downwardly. Such movement is transmitted both to the flapper lever 128, to either move it upwardly or downwardly and thereby pivot the flappers and change their position, and to the finger 270, to move it upwardly or downwardly and thereby move the slide 264 either up or down. When the flappers are in their "Toast" position, the slide is located in its upper position. In this position, the enlarged portion 292 of the slide is disposed adjacent to the narrow portion 294 of the latch bar. Therefore, when the pushbutton is depressed and the control member 120 rotated counterclockwise, a second laterally extending arm 296 formed on said control member contacts the enlarged portion 292 of the slide and moves the lower portion of the latch bar 116 toward the back wall 186 due to the pivotal mounting of the said latch bar on the rod 236. This has the effect of moving the upper portion of the latch bar away from the back wall, and the lower portion toward the back wall. As was previously disclosed, such movement causes the latching detent 118 to be moved out of the latch notch 114, and this allows the bread rack to move to its lower position by gravity. Due to the configuration of the latch 110, when the bread rack is in its lower position, the latch edge 112 retains the latch bar 116 in the position to which it is moved by depressing the pushbutton. This can be clearly seen in Fig. 7. Pivoting the latch bar 116 also has the effect of forcing flexible contact blade 192 toward the back wall 186 to close the contacts "E." This is effected through the laterally extending tab 298 which is formed on the lower end of the latch bar 116, and which at its free end supports an insulating button 300, which contacts the free end of the flexible contact blade 192 and forces it toward the back wall 186 when the latch bar pivots in response to the pushbutton being depressed.

It will, therefore, be apparent that by depressing the pushbutton, the control member 120 is pivoted counterclockwise and causes (1) movement of the flexible contact blades 188 and 190 as previously described toward the wall 186, (2) unlatching of the bread rack and (3) movement of the flexible contact blade 192 toward the back wall 186; it should be noted that items (2) and (3) occur only if the flappers are in "Toast" position. It has been described how the flexible contact blades 188 and 190 are individually allowed to return to their normal forward position to effect the desired switching changes. The flexible contact blade 192 is retained in its stressed rearward position with the contacts "E" closed whenever the bread rack is in its lower position for in this position the latch 110 forces the latch bar 116 to remain disposed so that its upper end is moved away from the back wall 186 and its lower end is moved toward the back wall 186. Conversely, whenever the bread rack is moved to its upper position, the latch bar 116 is allowed to return to its normal position, by virtue of the bias of the flexible contact blade 192 acting through the tab 298 and the latch bar itself, and thereby force the latching detent 118 to enter the latch notch 114 and retain the bread rack in its upper position.

The foregoing description of the control structure and the manner in which it operates applies principally to the "Toast" position of the appliance for the bread rack does not fall when the appliance is set for "Oven." Regardless of position of the flappers, variation in the period timed by the heat-up, cool-down sequence timer may be effected whenever the appliance is used for toasting (in either chamber) by adjusting the position of the color control plate 260. This can clearly be seen in Fig. 7, wherein the color control cam 302 is illustrated as cooperating with the projecting lug 304, which is rigidly secured to the color control plate 260. The cam 302 is rigidly secured to the adjusting rod 306, which is in turn rotatably mounted in the L-shaped bracket 308, and has the control knob 26 secured to its free end. A portion of the cam surface which engages the lug 304 within the range of movement of color control, is designed to raise or lower an end of the color control plate 260, and thereby ultimately determine the time when the adjustable screw 258 of the bimetallic arm 244 contacts the color control plate and allows the tip 240 to be moved out of its associated notch 248.

It is well to note that regardless of whether or not the pushbutton has been depressed or raised and, therefore, whether or not the control member 120 has been pivoted clockwise or counterclockwise, the pushbutton and control member will always return to a central, neutral position after the pushbutton is released, because of the locating spring 310. When the control member 120 is in its neutral position, and the yoke legs are in their rearward positions shown in Fig. 7, the horizontally extending arm 228 is spaced forwardly from portions 230 and 232, and thereby allows for independent forward movement of said yoke legs to their Fig. 11 positions. The spring is so designed that it has two end portions 312 and 314 which extend through openings in the wall 214 and provide an upper and lower resilient stop for a rearwardly extending arm 316 of the control member. Therefore, regardless of whether or not the arm 316 moves upwardly or downwardly as a result of the pushbutton being depressed or raised, it is resiliently urged to its neutral, central position by the spring 310, which is appropriately formed, as illustrated, so as to facilitate its mounting on the walls 186 and 214.

The rearwardly extending arm 316 has a lateral extension 318 which cooperates with the arm 320 formed on the tip side of the compensator arm bracket 250. Raising the pushbutton results in pivoting the control member 120 clockwise and thereby lowering the arm 318. A portion of the arm 318 contacts a portion of the arm 320 and thereby results in pivoting the compensator arm clockwise whenever the pushbutton is raised. This has the effect of manually (as opposed to automatically) causing movement of the tip 238 out of its notch 246 and thereby allowing the flexible contact blade 188 to move from its rearward to forward position at the will of the operator at any time. As will become apparent, this results in energizing the drive ribbons and de-energizing the heating element and, therefore, constitutes a means for terminating any cooking function of the appliance at any time, for it causes the bread rack to be raised to its upper position (if it has previously been lowered), the heating element to be de-energized, and the drive ribbons to be energized (if the bread rack has been previously lowered).

With the foregoing explanation of the purposes and functions of the appliance and the control structure in mind, and with the knowledge of the manner in which the individual portions and elements thereof operate, it is believed that an understanding of one complete toasting chamber toasting cycle may be had by referring to Figs. 5 through 12. Fig. 5 illustrates the positions of the control elements at the beginning of the toasting cycle. The knob 30 has been adjusted so that its pointer 32 points to "Toast," and this has had the effect of raising the end of the flapper lever 128 which cooperates with the finger 276 of the bell crank 274 to thereby move the flappers to position for toasting chamber operation and also to raise the slide 264 to its upper position. The foregoing is effected through the rotary motion of the knob 30 which is translated into pivotal motion of the adjusting bell crank 274 and generally vertical movement of both the finger 276 and slot 278 connection, and the slot 272 and finger 270 connection. The knob 26 has been adjusted so that its pointer 28 points anywhere within the range of "L" to "D" for the purpose of selecting the color of toast desired. Rotation of the knob 26 rotates the cam 302, which through the lug 304, raises or lowers the color control plate 260 to determine when the heating element is de-energized by the timer.

With the foregoing settings of the knobs 30 and 26, and the consequential positioning of the parts effected thereby, the various portions and elements of the control are positioned as illustrated in Fig. 5. The following facts should be recognized when the control is in this condition. The flexible contact blades 188, 190 and 192 are in their unstressed, undeflected condition wherein they are disposed generally parallel to and forwardly of the back wall 186. Therefore, the contacts at "B" and "F" are closed and the contacts at "A" and "E" are open. The electrical condition at this time may be observed in Fig. 6, which is a wiring diagram of the control when in this condition. The lower end of the latch arm 116 is positioned away from the back wall 186, and its upper end is positioned near said wall and, therefore, the latch detent 118 is located in the notch 114 of the latch 110 and the bread rack is latched in its upper position. The condition of the control member 120 is as follows: It is disposed in its central, neutral position by the ends 312 and 314 of the spring 310. The arm 318 of the control member is disposed above the arm 320 of the compensator arm 242. The control member arm 228 engages projections 230 and 232 of the yoke legs 216 and 218, respectively, and the yoke legs are in their forward position wherein they are spaced from the back wall 186. The tips 238 and 240 are held out of their associated notches 246 and 248, respectively, by portions of their associated yoke legs. The control member arm 296 engages the wide portion 292 of the slide 264.

Figure 7:
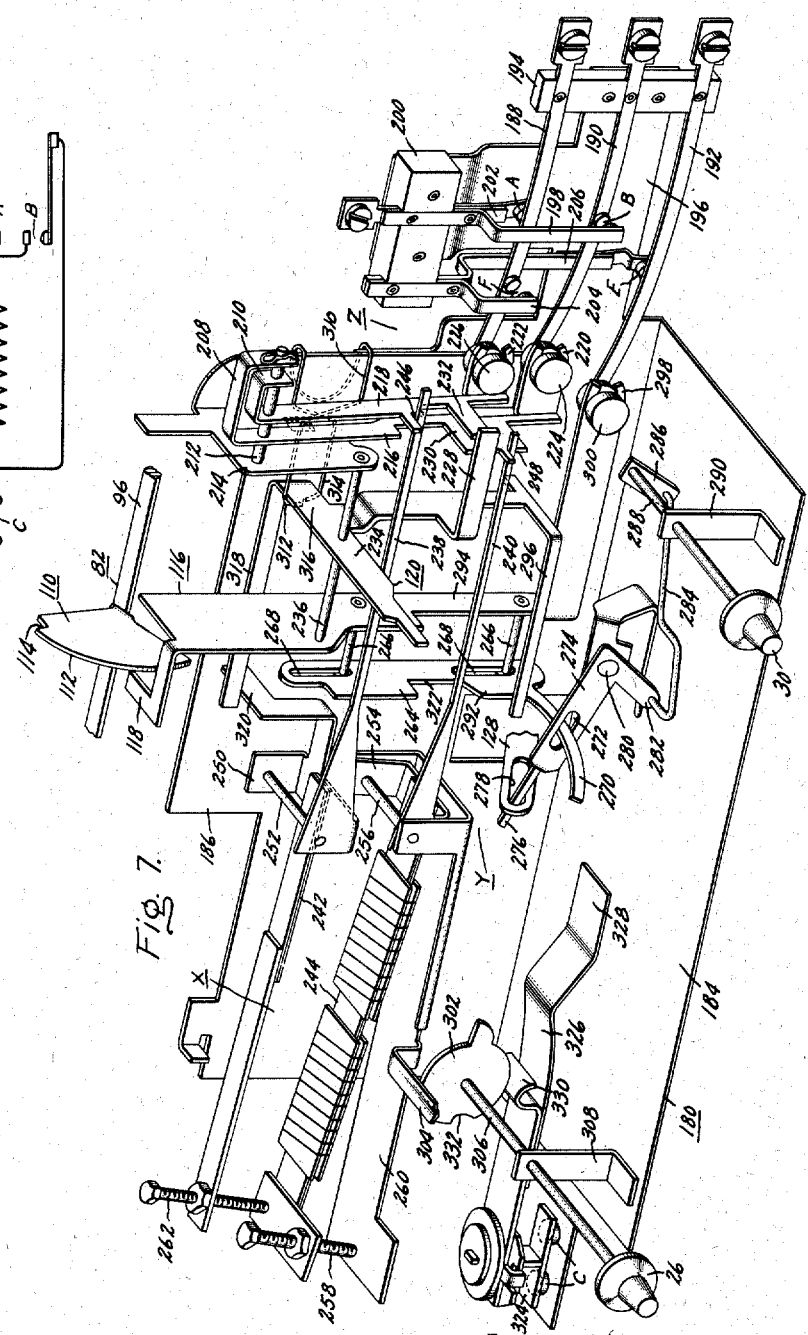
Fig. 7 is a view similar to Fig. 5 showing the control parts after the pushbutton has been depressed and the bread rack, which forms a part of the bread supporting means, has moved to its lower toasting position.

To initiate the toasting chamber operation, the pushbutton 34 is depressed and this pivots the control member 120 counterclockwise and causes adjustment of the control portions and elements to their positions shown in Fig. 7. The latch detent 118 is withdrawn out of the notch 114 of the latch 110 and thereby allows the force of gravity to lower the bread rack, which has the effect of pivoting the latch 110 in a clockwise direction as illustrated in Fig. 7. This results, because the arm 296 of the control member engages the wide portion 292 of the slide 264 and causes the latch bar 116 to rotate counterclockwise about its supporting pin 236. This has the effect of both unlatching the latch 110 and deflecting the flexible contact blade 192 so that it is moved to its rearward position and the contacts at "E" are closed. Counterclockwise movement of the control member 120 also results in its arm 228 contacting the extending portions 230 and 232 of the yoke legs 216 and 218, respectively, and pushing them toward the back wall 186 and thereby deflecting flexible contact blades 188 and 190 to rearward positions so that the contacts at "F" and "B" are opened and contacts at "A" are closed. The electrical condition of the switch portion Z at this time is illustrated in the Fig. 8 wiring diagram which corresponds to the Fig. 7 condition of the control. When the yoke legs 216 and 218 are pushed to their rearward positions, the tips 238 and 240 are moved upwardly into the notches 246 and 248, respectively, by the distribution of weight in their supporting arms which causes the arms to rotate counterclockwise. The location of the tips 238 and 240 in their associated notches, at this time, has the effect of restraining forward movement of the yoke legs, which are urged away from the back wall 186 by the bias of the flexible contact blades 188 and 190.

Figure 8:
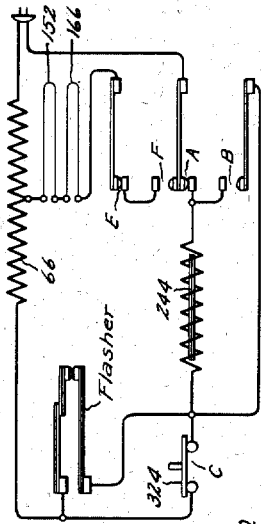
Fig. 8 is a view similar to Fig. 6, but corresponding to the condition of the control when in its Fig. 7 condition.

As can be seen from the Fig. 8 wiring diagram, when the control is in the Fig. 7 condition, the bimetallic arm heater and the main heating element are energized. This causes both rapid heating of the bimetallic arm and its consequent deflection, and toasting of the bread on the bread rack. When the bimetallic arm 244 deflects sufficiently, the adjusting screw 258 on its left end contacts the color control plate 260 and, thereafter, further deflection results in the tip 240 being rotated clockwise and ultimately being lowered out of the notch 248, at which time the yoke leg 216 is moved away from the back wall 186 by the flexible contact blade 190. This condition is shown in Fig. 9, where it will be observed that the tip 240 is no longer located in the notch 248, and the flexible contact blade 190 has been moved away from the back wall 186 to close the contacts at "B." Fig. 10 illustrates the electrical condition of the switch elements when the control is in the Fig. 9 condition.

Closing of the contact "B" short out the bimetallic arm heater and the bimetallic arm begins to cool. The horizontal portion of the yoke leg 216 below and adjacent to the notch 248 holds the tip 240 in such a manner that upward movement of said tip is prevented; therefore, as the bimetallic arm cools, the left-hand end of the bimetallic arm is raised as the bimetallic arm straightens out, and it ultimately contacts the left-hand end of the compensator arm 242. Further straightening out of the bimetallic arm, on its cooling further, results in moving the adjusting screw 262 upwardly and pivoting the left-hand end of the compensator arm clockwise and, consequently, in lowering the tip 238 downwardly out of the notch 246. This allows the yoke leg 218 to be moved away from the back wall 186 by the bias of the flexible contact blade 188 and this results in opening the contacts "A" and closing the contacts "F." The condition of the control at this time is illustrated in Fig. 11, and from the wiring diagram of Fig. 12, which indicates the electrical condition of the switch elements of the control when it is in the Fig. 11 condition, it will be observed that this results in opening the circuit through the main heating element and closing the circuit through the drive ribbons.

Actually, in practice, one-half of the main heating element was left in the circuit at this time for the purpose of electrical ballast and Fig. 7 reflects this fact. Throughout this specification reference has been made to de-energizing the main heating element and energizing the drive ribbons at this point in the operation of the control. This is not inconsistent with the foregoing, for it should be realized that although it was found expedient in practice to have one-half of the main heating element remain energized, this is not for the purpose of toasting the bread, and further because other electrical ballast could be substituted for the half of the main heating element, and the latter could be entirely de-energized.

Energization of the drive ribbons results in raising the bread rack to its upper position in the manner previously described in detail, and this has the effect of swinging the control arm 82 in such a manner that the latch 110 pivots counterclockwise as viewed in Fig. 11. When the bread rack reaches its upper position, the latch detent 118 enters the latch notch 114 as a result of the bias of the flexible contact blade 192 on the lower end of the latch bar 116, which moves said lower end away from the back wall 186 and the latch detent toward the back wall 186 into the notch 114. This has the effect of latching the bread rack in its upper position and opening the contacts at "E." The condition of the control at this time is identical to that illustrated in Fig. 5, which is the condition of the control at the end and beginning of a toasting chamber operation. Opening the contacts at "E" results in de-energization of the drive ribbons and allows them to cool and contract. However, due to the lost motion connection between the bell crank link 134 and the crank 130 on the control arm 80, the bread rack remains in its upper latched position.

Figure 14:
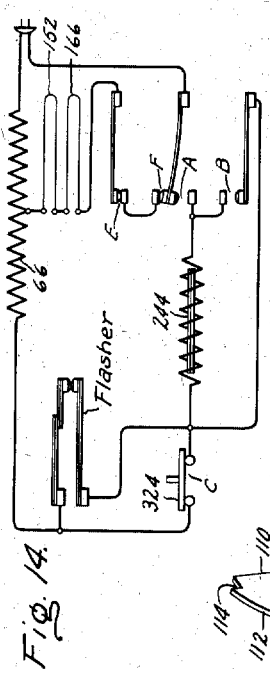
Fig. 14 is a view similar to Fig. 6, but corresponding to the Fig. 13 condition of the control.

Operation of the appliance may be manually terminated at any time at the will of the operator. Assume that a toasting chamber operation has been commenced and the operator suddenly decides that he would like to terminate the operation of the appliance. Let us assume that the pushbutton has been depressed and that the switch elements of the control have been moved to their Fig. 7 positions, which is the condition of the control just after the pushbutton has been depressed and the bread rack has fallen to its lower position. In this condition, the timer has been re-set, i.e., the tip 238 is disposed in the notch 246, and the tip 240 is disposed in the notch 248. From Fig. 8 it will be observed that at this time the contacts at "B" and "F" are open, and that contacts at "A" and "E" are closed; if a normal toasting chamber operation were to ensue, both the main heating element and the bimetallic arm heater are energized. However, if the operator decides to terminate the cycle before the bimetallic arm heater has deflected the bimetallic arm sufficiently so as to short out the bimetallic arm heater, the operator may terminate the toasting chamber operation by raising the pushbutton, and this has the effect of rotating the control member 120 clockwise. Such rotation has the effect of lowering the arm 318 on the control member, which in turn contacts and lowers the arm 320 on the compensating arm bracket 250. This causes compensating arm 242 to rotate clockwise about its pivot pin 252, which lowers the tip 238 out of the notch 246. The condition of the control at this time is illustrated in Fig. 13 and in its corresponding electrical condition reflected in the wiring diagram of Fig. 14.

Figure 13:
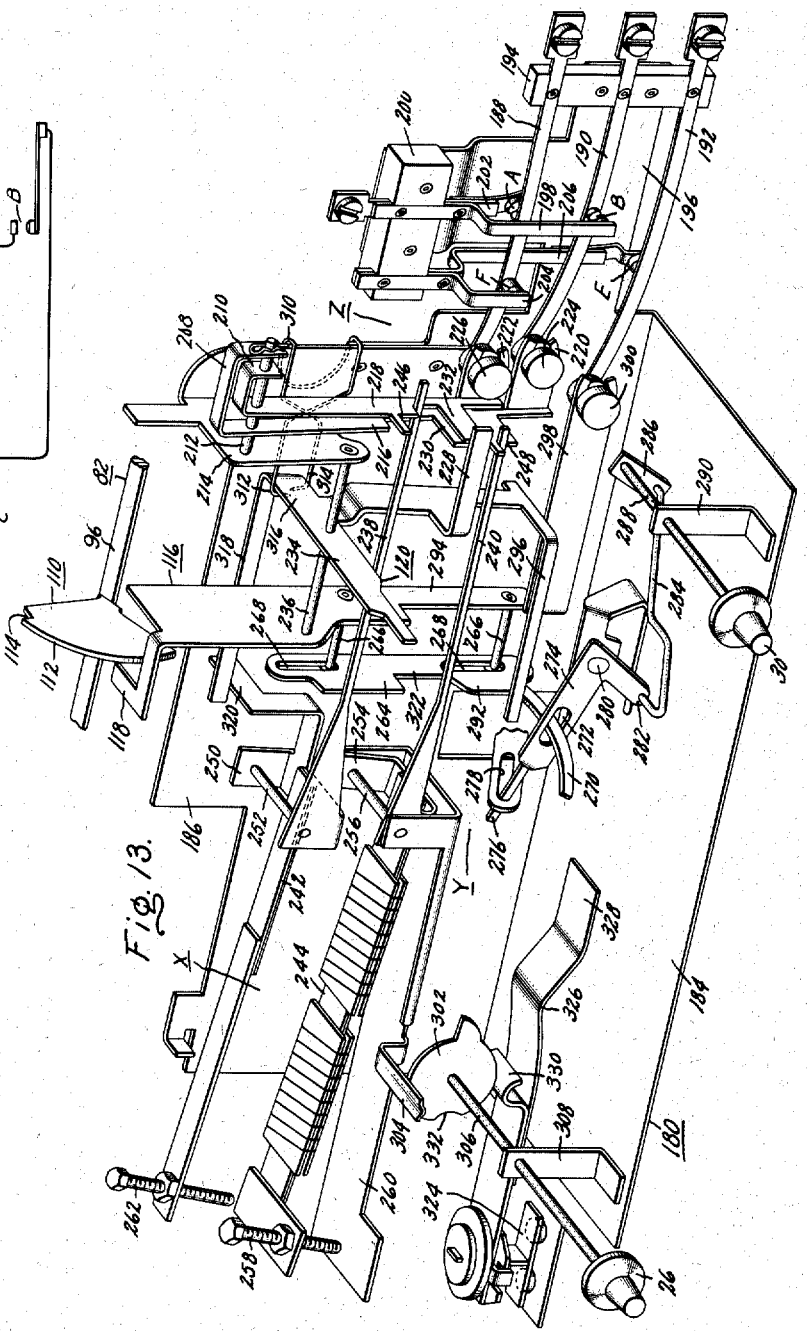
Fig. 13 is a view similar to Fig. 7, but illustrating the control parts after the pushbutton has been raised to terminate a toasting chamber toasting cycle at the will of the operator.

It will be seen in Fig. 13 that raising the pushbutton has the ultimate effect of allowing the flexible contact blade 188 to move yoke leg 218 away from the back wall 186 and thereby close the contacts at "F" and open the contacts at "A." This switch adjustment results in energizing the drive ribbons and de-energizing the main heating element (except for half of the heating element which is used for ballast), and this causes the bread rack to be raised to its upper position. When the bread rack reaches its upper position, flexible contact blade 192 forces the lower end of the latch bar 116 away from the back wall 186, and the upper end of the latch bar toward said back wall so that the latching detent 118 enters the latch notch 114. This causes the contacts at "E" to be opened, and results in de-energizing the drive ribbons (and the one-half of the heating element). It will, therefore, be observed that to interrupt the toasting chamber operation by raising the pushbutton before the bimetallic arm heater is de-energized, results in terminating operation in the same manner as though the timer had gone through a complete heat-up, cool-down cycle, except that the tip 238 is moved out of its notch 246 by the manual motion of the control member, and the fact that the tip 240 still remains in its notch 248. This latter point is of no operational consequence, for on commencing the next toasting chamber operation, by depressing the pushbutton, the timer will be re-set, and this simply means that the tip 240 is already re-set in its associated notch.

Let us now consider the control of the oven cooking functions which the appliance is capable of performing. There are two general types of functions, namely, oven chamber toasting and oven chamber warming. Regardless of which type of function is being performed, it is necessary to adjust the knob 30 so that its pointer 32 points toward "Oven." This serves to perform two functions: (1) the position of the flappers is changed so that they will direct the heat emitted from the heating element 66 downwardly into the oven chamber and (2) the position of the slide 264 is adjusted (moved to its lower position) so that the latch bar 116 is not rotated when the pushbutton is depressed. By reference to Fig. 15, which illustrates the condition of the control after the knob 30 has been adjusted to the "Oven" position, but before the pushbutton has been depressed, it will there be seen that rotation of the control knob 30 is translated through the linkage of the rod 288, lug 286, connecting rod 284, and bell crank 274, through the finger 276 into vertically downward movement of the end of the flapper lever 128. This has the effect of moving the flappers to their upper position.

With the parts of the control so disposed, the control knob 26 is then adjusted to effect either an oven chamber warming or an oven chamber toasting operation. If the pointer 28 is pointed within the range of L through D, an oven chamber toasting operation will be effected and the timer portion X will control the energization of the main heating element so as to produce toast of the color selected. Energization of the main heating element occurs after the pushbutton is depressed and the control member 120 rotates on its supporting pin 236 in a counterclockwise direction; as in the case of a toaster chamber operation, this has the effect of pushing the yoke legs 216 and 218 toward the back wall 186 and, in effect, re-sets the timer by allowing the tips 238 and 240 to be moved into their co-operating notches 246 and 248, respectively. However, due to the position of the slide 264, the latch bar 116 is not rotated as it is in the case of a toasting chamber operation, because control member arm 296 is not juxtaposed to the wide portion 292 of the slide so that it might engage it and thereby rotate the latch bar 116, but rather is disposed adjacent to the narrow portion 322 of the slide. Therefore, when the control member is rotated counterclockwise, its arm 296 moves in the cutout portion of the slide adjacent to the narrow portion 322 without moving the latch bar; therefore, whenever the appliance is set in "Oven" position, the slide is in its lower position and depressing the pushbutton does not result in pivoting the latch bar. Therefore, the contacts "E" are not closed and the bread rack remains in its upper position, because the latching detent 118 is not moved out of the notch 114 in the latch 110.

Fig. 16 illustrates the electrical condition of the control when the appliance is in oven chamber toasting condition. Depressing the pushbutton causes the contacts "F" and "B" to open, and the contacts "A" to close. This causes the main heating element to be energized and the timer bimetallic arm heater to be energized. Thereafter, after an appropriate amount of deflection of the bimetallic arm 244, the tip 240 is moved out of its associated notch; contacts "B" are thereby closed resulting in shorting out the timer bimetallic arm heater and, hence, its de-energization. The latter results in cooling and undeflection of the bimetallic arm 244, and ultimately results in pivoting the compensator arm 242 clockwise so that its tip 238 is moved out of its associated notch, which results in opening the contacts at "A" and closing the contacts at "F." This results in de-energization of the main heating element. Due to the fact that the contacts "E" are open, the drive ribbons are not energized at this time.

For an oven chamber warming operation, substantially the same operation takes place in the control as when performing oven chamber toasting, with the exception that the knob 26 is adjusted to the "Oven Warm" position, and this causes the flasher, which is normally shorted out of the circuit, to be placed into the circuit, as can be seen best in the Fig. 17 diagram. This results in the intermittent energization and de-energization of the main heating element so as to cause the oven chamber to be warmed without the main heating element being energized continuously. The flasher is normally shorted out of the circuit by the shorting bar 324, see Fig. 15 wherein the normal position of the elements which provide for either shorting the flasher out of the circuit or allowing it to remain in the circuit are illustrated in solid lines in the normal "flasher shorted out" condition, and in dotted lines in the "Oven Warm" position, wherein the flasher is in the circuit. It will there be seen that the shorting bar 324 normally contacts the contacts "C" and thereby shorts out the flasher (see Fig. 16 wiring diagram). The shorting bar is mounted on the switch spring 326, which has one of its ends 328 rigidly secured to the horizontal wall 180 of the control bracket. Mounted centrally of the switch spring 326 is a resilient detent 330 which normally presses against the color control cam 302 and retains it in whatever position it is adjusted to. Detent 330 is adapted to enter the notch 332 formed in one portion of the cam 302 when the knob 26 is adjusted to the "Oven Warm" position. This is illustrated in dotted lines in Fig. 15, wherein it will be observed that when in "Oven Warm" position, the detent 330 enters the notch 332 due to the upward bias of spring 326, and the latter thereby moves the shorting bar 324 out of contact with the contacts "C." This has the effect, as can be seen in the wiring diagram of Fig. 17, of placing the flasher into the circuit.

When set for "Oven Warm" operation, the heating element is intermittently energized by depressing the pushbutton. The oven warming operation is terminated by raising the pushbutton; this has the effect of opening contacts "A" and closing contacts "F." This de-energizes the main heating element, but since the contacts "E" are open, the drive ribbons are not energized.

In view of the foregoing, it will be apparent that a multiple purpose cooking appliance has been provided wherein a single control governs all of the many varied cooking operations that may be performed by the appliance. It should be noted particularly that the appliance may be utilized in any of the following ways: (1) The toasting chamber may be used as an automatic, pushbutton actuated toaster having a hot wire, bread rack drive, toast color selection, and if desired, a long bread slot. (2) The oven chamber may be used to toast or broil objects of thicknesses up to or in excess of normal sliced bread, with toast color section afforded. (3) The oven chamber may be used to warm previously toasted or cooked objects of thicknesses up to or in excess of normal sliced bread. Regardless of which way the appliance is utilized, the operation is initiated by depressing the pushbutton. In the case of toasting chamber operation or oven chamber toasting operation, color control of the toast is afforded and the operation is automatically terminated; however, premature termination may be manually effected by raising the pushbutton. In the case of oven chamber warming operation, the normal way of terminating operation is to raise the pushbutton.

As will be evident from the foregoing description, certain aspects of my invention are not limited to the particular details of construction of the example illustrated, and I contemplate that various and other modifications and applications of the invention will occur to those skilled in the art. It is, therefore, my intention that the appended claims shall cover such modifications and applications as do not depart from the true spirit and scope of my invention.

What I claim as new and desire to secure by Letters Patent of the United States is:

1. A cooking appliance comprising: a toasting chamber; an oven chamber; said chambers communicating with each other, electrical heating means and heating directing means disposed in the area of communication of said chambers; said heat directing means being selectively positionable to direct heat from said heating means to either of said chambers, and a control for controlling the operation of said appliance; said control having: manually operated means for controlling the position of said heat directing means whereby the appliance may be set for either a toasting chamber operation or an oven chamber operation; electrical means for energizing said heating means; and means for timing a toasting period which is operatively associated with said last-named means to cause de-energization of said heating means at the end of a toasting period to thereby terminate the operation of the appliance regardless of the position of said heat directing means.

2. An appliance as defined in claim 1 which further includes: an electrical circuit having said heating means therein; and a flasher which is adapted to be selectively placed in or out of said circuit; said flasher when in said circuit being adapted to respond to heat in the appliance to intermittently open and close said circuit to thereby intermittently energize and de-energize said heating means, and wherein said control further includes means for selectively placing said flasher in or out of said circuit.

3. An appliance as defined in claim 1 which further includes: a bread rack mounted in said toasting chamber for movement between a toasting and a non-toasting position; and means for latching said bread rack in its non-toasting position; said bread rack being adapted to be unlatched and allowed to move to its toasting position in response to initiation of a toasting operation, and wherein said control further includes unlatching means which is inoperative when said control sets said heat directing means for oven chamber operation whereby said bread rack is allowed to move to toasting position only when the appliance is set for a toasting chamber operation.

4. An appliance as defined in claim 3 which further includes means for driving said bread rack from its toasting to non-toasting position; wherein said timing means is adapted to energize said driving means at the completion of the timed toasting period to return said bread rack to its non-toasting period, and wherein said control further includes means for de-energizing said driving means when said bread rack reaches its non-toasting position.

5. An appliance as defined in claim 4 wherein said bread rack is movable between an upper non-toasting position and a lower toasting position, and said bread rack when unlatched falls from its upper position to its lower position as a result of the force of gravity.

6. An appliance as defined in claim 1 wherein said timing means normally operates to automatically de-energize said heating means after completion of the timed toasting period, and said control further includes manually operable means for deenergizing said heating means before completion of said timed toasting period to thereby permit selective termination of the operation of said appliance at the will of the operator.

7. An appliance as defined in claim 1 which further includes: a bread rack which is mounted in said toasting chamber for movement between a toasting and a non-toasting position; means for latching said bread rack in non-toasting position; and means for driving said bread rack to its non-toasting position; and wherein said control further includes: means for simultaneously unlatching said bread rack to allow said bread rack to move to its toasting position and for energizing said heating means; means for energizing said driving means at the end of a toasting period to return said bread rack to its non-toasting position; and means for de-energizing said driving means when said bread rack reaches its non-toasting position.

8. An appliance defined in claim 7 wherein said control further includes manually operable means for de-energizing said heating means and energizing said driving means before the end of a timed toasting period to thereby allow selective termination of the operation of said appliance at the will of the operator.

9. An appliance as defined in claim 1 which further includes: a bread rack which is mounted in said toasting chamber for movement between a toasting and a non-toasting position; means for latching said bread rack in non-toasting position; and means for driving said bread rack to its non-toasting position; wherein said control further includes: means for simultaneously unlatching said bread rack to allow said bread rack to move to its toasting position and for energizing said heating means; said timing means being adapted to cause energization of said driving means at the end of a timed toasting period whereby said bread rack is returned to its non-toasting position, means for de-energizing said driving means when said bread rack reaches its non-toasting position; and switch elements for controlling the electrical circuitry of the appliance; and wherein said means for simultaneously unlatching said bread rack and energizing said heating means comprises a pushbutton operated member having a portion for causing the unlatching of said bread rack and causing a switch element adjustment, and a portion for setting the timing means and causing adjustment of other switch elements.

10. An appliance as defined in claim 9 wherein said means for simultaneously unlatching said bread rack and energizing said heating means further comprises: a pivotal latch bar having a latching detent; a slide supported by said latch bar; said slide being juxtaposed to said first-mentioned portion of said member when said heat directing means is in position for toasting chamber operation whereby said slide is adapted to be engaged by said first-mentioned portion and moved to thereby pivot said latch bar and move said latching detent to unlatch said bread rack when said member is operated, said slide being movable to a position removed from said first-mentioned portion when said heat directing means is in position for oven chamber operation whereby said slide is not engaged by said first-mentioned portion and said bread rack is not unlatched when said member is operated.

11. A cooking appliance comprising: a toasting chamber; means for heating said chamber; a bread rack in said chamber and movable between a toasting and non-toasting position; means for latching said bread rack in its non-toasting position; a control having means for unlatching said bread rack and allowing it to move to its toasting position; and means for driving said bread rack from its toasting to non-toasting position; said control further having: means for energizing said heating means when said bread rack is in its toasting position; means for timing a toasting period and de-energizing said heating means and energizing said driving means at the end thereof; and manually operated means for simultaneously actuating said unlatching means and said means for energizing said heating means.

12. An appliance as defined in claim 11 wherein said bread rack is movable between an upper non-toasting position and a lower toasting position, and said bread rack when unlatched falls from its upper position to its lower position as a result of the force of gravity.

13. A control for use in a combination cooking appliance having: a toaster chamber; an oven chamber; said chambers communicating with each other, heating means and heat directing means in the area of communication of said chambers; said heat directing means being selectively positionable to direct heat from said heating means to either of said chambers, a bread rack mounted in said toasting chamber for movement between a toasting and a non-toasting position; means for latching said bread rack in its non-toasting position; said bread rack being adapted to be unlatched and allowed to move to its toasting position in response to initiating a toasting operation, and means for driving said bread rack from its toasting to its non-toasting position; said control comprising: means for unlatching said bread rack; said unlatching means being inoperative when said heat directing means is positioned to direct heat into said oven chamber, means for simultaneously positioning said heat directing means to direct heat into said toasting chamber and for rendering said unlatching means operative; means for energizing said heating means when said bread rack is in its toasting position; means for timing a toasting period; and means for de-energizing said heating means and energizing said bread rack driving means at the end of a toasting period.

14. A control as defined in claim 13 which further includes: a pushbutton operated member; a latching bar; a pair of pivotal yokes; a plurality of electrical contact carrying switch blades; and a timer which operates in a heat-up, cool-down sequence; said timer comprising a bimetallic arm having a heater, and a compensating arm; said arms having portions adapted to cooperate with said yokes, each of said yokes being adapted to adjust one of said contact carrying blades, said latching bar supporting at one of its ends said unlatching means, said latching bar supporting at its other end a portion for engaging an electric contact carrying blade, said latch bar being pivotally mounted centrally of its ends, said member having a portion for pivoting said latch bar to thereby unlatch said bread rack and adjust the position of the electric contact carrying blade associated with said latch bar, and said member having another portion for engaging and moving said yokes to both allow resetting of the timer and to move the electric contact carrying blades which cooperate with said yokes, whereby movement of said member resets said timer and adjusts the electrical contacts so as to energize said heating means, and unlatches said bread rack, whereby said timer thereafter operates through its sequence to cause further adjustments of said electrical contacts to, first, de-energize the heater for the bimetallic arm of the timer, and, then, de-energize said heating means and energize said driving means to raise said bread rack to its non-toasting position, said latching bar when said bread rack reaches its non-toasting position being pivoted to latch said bread rack and to allow the electrical contact blade associated with said latch bar to move and de-energize said driving means.

15. A control as defined in claim 14 wherein said member has another portion which is adapted to contact said compensator arm when said member is moved in a direction opposite to the direction for initiating operation of the appliance to thereby manually move said compensating arm and allow the yoke associated with its tip to move its associated electrical contact blade to thereby de-energize the heating means and energize the driving means at the will of the operator.

16. A control as defined in claim 13 wherein said control further comprises: a pivotal latch bar; stationary electrical contacts; three flexible electrical contact blades; said blades carrying electrical contacts which cooperate with said stationary electrical contacts, said blades having portions which are adapted to be acted on so as to stress said blades and adjust the positions of their electrical contacts, one of said blades being acted on by an end portion of said latch bar, the other end portion of said latch bar supporting a latching detent, a pushbutton operated member which moves said latching bar when said member is depressed and said heat directing means is in position to direct heat to said toasting chamber to thereby both unlatch the bread rack and adjust the position of the electrical contact carried by said one of said blades; and a pair of vertically pivotal yokes adapted to bias the other two blades to their stressed positions; said yokes normally being in positions wherein they do not stress said blades, but being movable by a portion of said member to positions wherein they stress said blades, and wherein said timer comprises a bimetallic arm and a heater therefor, and a compensating arm; each of said arms having an extending tip; one of which cooperates with one of said yokes and the other which cooperates with the other said yokes, said tips normally being urged to a position wherein they enter notches in said yokes and restrain movement of said yokes away from their position wherein they bias said blades, said yokes being moved to said last-named position by said member when it is depressed, the condition of the electrical circuit after depressing said member being such that said bimetallic arm heater and said heating means are energized, said bimetallic arm on heating up in response to energization of its heater being adapted to move out of its notch and thereby allow one of said yokes to be moved forward by its associated contact blade to thereby adjust its associated contact, which results in de-energizing said bimetallic arm heater whereby cooling down of said bimetallic arm ensues and this ultimately results in pivoting the compensator arm so that its tip moves out of its yoke notch and allows the other contact blade to move its associated yoke forward and thereby adjust its contact, which results in said heating means being de-energized and said driving means being energized whereby said bread rack is raised and moved to its non-toasting position, and when said bread rack reaches its non-toasting position, said first-mentioned contact blade moves the portion of said latch bar which it cooperates with and thereby pivots said latch bar so as to cause its latching detent to latch said bread rack in non-toasting position and also to move the electrical contact which it is associated with so as to de-energize said driving means.

References Cited in the file of this patent

UNITED STATES PATENTS

| | | |
|---|---|---|
| 1,862,733 | Wright | June 14, 1932 |
| 2,555,697 | Lillyblad | June 5, 1951 |
| 2,642,270 | Hollingsworth | June 6, 1953 |
| 2,750,874 | Ireland | June 19, 1956 |

UNITED STATES PATENT OFFICE
CERTIFICATE OF CORRECTION

Patent No. 2,920,551 January 12, 1960

Wilbur A. Schmall

It is hereby certified that error appears in the printed specification of the above numbered patent requiring correction and that the said Letters Patent should read as corrected below.

Column 8, line 40, for "asigned" read -- assigned --; column 9, line 38, for "break reack" read -- bread rack --; column 11, line 51, for "bimettalic" read -- bimetallic --; column 18, line 54, for "short" read -- shorts --; column 21, line 73, for "section" read -- selection --; column 22, line 23, for "heating", second occurrence, read -- heat --.

Signed and sealed this 26th day of July 1960.

(SEAL)
Attest:

KARL H. AXLINE
Attesting Officer

ROBERT C. WATSON
Commissioner of Patents